US009939299B2

(12) United States Patent
Patel et al.

(10) Patent No.: US 9,939,299 B2
(45) Date of Patent: *Apr. 10, 2018

(54) SENSING EVENTS AFFECTING LIQUID FLOW IN A LIQUID DISTRIBUTION SYSTEM

(71) Applicant: University of Washington, Seattle, WA (US)

(72) Inventors: Shwetak N. Patel, Seattle, WA (US); James A. Fogarty, Seattle, WA (US); Jon E. Froehlich, Seattle, WA (US); Eric C. Larson, Seattle, WA (US)

(73) Assignee: UNIVERSITY OF WASHINGTON, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/010,177

(22) Filed: Jan. 29, 2016

(65) Prior Publication Data

US 2016/0146648 A1 May 26, 2016

Related U.S. Application Data

(63) Continuation of application No. 13/888,917, filed on May 7, 2013, now Pat. No. 9,250,105, which is a (Continued)

(51) Int. Cl.
*G01F 1/34* (2006.01)
*E03B 7/07* (2006.01)
(Continued)

(52) U.S. Cl.
CPC ............... *G01F 1/34* (2013.01); *E03B 7/071* (2013.01); *F17D 1/08* (2013.01); *F17D 5/02* (2013.01);
(Continued)

(58) Field of Classification Search
CPC ............... G01L 7/00; G01F 1/34; G01M 3/26
(Continued)

(56) References Cited

U.S. PATENT DOCUMENTS 2,991,481 A 7/1961 Book
4,804,957 A 2/1989 Selph et al.
(Continued)

FOREIGN PATENT DOCUMENTS

CN 1809738 A 7/2006
CN 101160518 A 4/2008
(Continued)

OTHER PUBLICATIONS

Ao, et al. Ultrasonic Clamp-On Flow Measurement of Natural Gas, Steam, and Compressed Air. 9 pp., 2009. <http://www.gesensing.com/products/resources/whitepapers/us268.pdf>.
(Continued)

*Primary Examiner* — Craig Schneider
*Assistant Examiner* — Nicole Gardner
(74) *Attorney, Agent, or Firm* — Wilson Sonsini Goodrich & Rosati

(57) ABSTRACT

By monitoring pressure transients in a liquid within a liquid distribution system using only a single sensor, events such as the opening and closing of valves at specific fixtures are readily detected. The sensor, which can readily be coupled to a faucet bib, transmits an output signal to a computing device. Each such event can be identified by the device based by comparing characteristic features of the pressure transient waveform with previously observed characteristic features for events in the system. These characteristic features, which can include the varying pressure, derivative, and real Cepstrum of the pressure transient waveform, can be used to select a specific fixture where a valve open or close event has occurred. Flow to each fixture and leaks in
(Continued)

the system can also be determined from the pressure transient signal. A second sensor disposed at a point disparate from the first sensor provides further event information.

20 Claims, 11 Drawing Sheets

Related U.S. Application Data continuation of application No. 12/483,041, filed on Jun. 11, 2009, now Pat. No. 8,457,908.

(51) Int. Cl.
| | |
|---|---|
| *F17D 1/08* | (2006.01) |
| *F17D 5/02* | (2006.01) |
| *G01M 3/28* | (2006.01) |
| *G01M 3/26* | (2006.01) |

(52) U.S. Cl.
CPC ............ *G01M 3/26* (2013.01); *G01M 3/2807* (2013.01); *G01M 3/2815* (2013.01); *Y10T 137/0318* (2015.04); *Y10T 137/8175* (2015.04)

(58) Field of Classification Search
USPC .......................................... 137/551
See application file for complete search history.

(56) References Cited

U.S. PATENT DOCUMENTS

| | | | |
|---|---|---|---|
| 4,858,141 | A | 8/1989 | Hart et al. |
| 5,004,014 | A | 4/1991 | Bender |
| 5,409,037 | A | 4/1995 | Wheeler et al. |
| 5,441,070 | A | 8/1995 | Thompson |
| 5,483,838 | A | 1/1996 | Holden |
| 5,568,825 | A | 10/1996 | Faulk |
| 5,635,895 | A | 6/1997 | Murr |
| 5,875,812 | A | 3/1999 | Miller |
| 6,273,686 | B1 | 8/2001 | Kroell et al. |
| 6,389,881 | B1 | 5/2002 | Yang et al. |
| 6,568,416 | B2 | 5/2003 | Tucker et al. |
| 6,728,646 | B2 | 4/2004 | Howell et al. |
| 6,763,843 | B1 | 7/2004 | Dickerson et al. |
| 6,839,644 | B1 | 1/2005 | Woods et al. |
| 6,853,291 | B1 | 2/2005 | Aisa |
| 6,860,288 | B2 | 3/2005 | Uhler |
| 6,869,644 | B2 | 3/2005 | Buhay et al. |
| 6,944,523 | B2 | 9/2005 | Addink et al. |
| 6,963,808 | B1 | 11/2005 | Addink et al. |
| 6,993,417 | B2 | 1/2006 | Osann, Jr. |
| 7,043,380 | B2 | 5/2006 | Rodenberg et al. |
| 7,049,976 | B2 | 5/2006 | Hunt et al. |
| 7,174,771 | B2 | 2/2007 | Cooper |
| 7,276,915 | B1 | 10/2007 | Euler et al. |
| 7,306,008 | B2 | 12/2007 | Tornay |
| 7,330,796 | B2 | 2/2008 | Addink et al. |
| 7,400,986 | B2 | 7/2008 | Lathan et al. |
| 7,460,930 | B1 | 12/2008 | Howell et al. |
| 7,493,221 | B2 | 2/2009 | Caggiano et al. |
| 7,508,318 | B2 | 3/2009 | Casella et al. |
| 7,541,941 | B2 | 6/2009 | Bogolea et al. |
| 7,546,214 | B2 | 6/2009 | Rivers, Jr. et al. |
| 7,669,461 | B2 | 3/2010 | Kates |
| 7,710,282 | B1 | 5/2010 | Young |
| 7,711,454 | B2 | 5/2010 | Addink |
| 7,719,257 | B2 | 5/2010 | Robarge et al. |
| 8,436,738 | B2 | 5/2013 | Bach et al. |
| 8,457,908 | B2 | 6/2013 | Patel et al. |
| 8,667,978 | B2 | 3/2014 | Ford |
| 9,250,105 | B2 | 2/2016 | Patel et al. |
| 9,297,467 | B1 | 3/2016 | Goseco |
| 2001/0003286 | A1 | 6/2001 | Philippbar et al. |
| 2002/0148515 | A1* | 10/2002 | Coffey ................ E03B 7/071 |
| | | | 137/624.11 |
| 2003/0088527 | A1 | 5/2003 | Hung et al. |
| 2004/0128034 | A1 | 7/2004 | Lenker et al. |
| 2004/0140908 | A1 | 7/2004 | Gladwin et al. |
| 2004/0163705 | A1 | 8/2004 | Uhler |
| 2004/0206405 | A1 | 10/2004 | Smith et al. |
| 2005/0067049 | A1 | 3/2005 | Fima |
| 2005/0126635 | A1 | 6/2005 | Addink et al. |
| 2006/0260691 | A1* | 11/2006 | Davidoff ............. G01M 3/2807 |
| | | | 137/487.5 |
| 2007/0068225 | A1 | 3/2007 | Brown |
| 2008/0066812 | A1 | 3/2008 | Tornay |
| 2008/0086394 | A1 | 4/2008 | O'Neil et al. |
| 2008/0184781 | A1 | 8/2008 | Mulligan et al. |
| 2008/0251131 | A1 | 10/2008 | Ford |
| 2008/0255782 | A1 | 10/2008 | Bilac et al. |
| 2008/0295895 | A1 | 12/2008 | Vincent et al. |
| 2009/0043427 | A1 | 2/2009 | Addink |
| 2009/0072985 | A1 | 3/2009 | Patel et al. |
| 2010/0241367 | A1 | 9/2010 | Yada et al. |
| 2010/0313958 | A1 | 12/2010 | Patel et al. |
| 2014/0026644 | A1 | 1/2014 | Patel et al. |
| 2014/0165731 | A1 | 6/2014 | Linford |
| 2017/0131174 | A1 | 5/2017 | Enev et al. |

FOREIGN PATENT DOCUMENTS

| | | |
|---|---|---|
| DE | 102007032053 A1 | 1/2009 |
| EP | 1024352 A2 | 8/2000 |
| GB | 2228335 A | 8/1990 |
| JP | 08-338784 A | 12/1996 |
| JP | 3461973 B2 | 10/2003 |
| JP | 2005337932 A | 12/2005 |
| TW | I352886 B | 11/2011 |
| WO | WO-2006036513 A1 | 4/2006 |
| WO | WO 2008/128127 A1 | 10/2008 |
| WO | WO 2010/007369 A2 | 1/2010 |
| WO | WO-2010144100 A1 | 12/2010 |
| WO | WO-2017083547 A1 | 5/2017 |

OTHER PUBLICATIONS

Arregui, et al. Evaluating Domestic Water Meter Accuracy: A Case Study. 343-352, 2003.

Arroyo, et al. Waterbot: Exploring Feedback and Persuasive Techniques at the Sink. CHI 2005—Papers: Technology in the Home: 631-639, 2005.

Arvola, et al. Billing Feedback as a Means to Encourage Household Electricity Conservation: A Field Experiment in Helsinki. Proceedings of the 1993 Summer Study of the European Council for Energy Efficient Economy: 11-21, 2003.

Balash, et al. Natural Gas and Electricity Costs and Impacts on Industry. National Energy Technology Laboratory: 17 pp., 2008.

Bao, et al. Activity Recognition from User-Annotated Acceleration Data. Pervasive: 1-17, 2004.

Bechmann, et al. Some Assembly Required: Supporting End-User Sensor Installation in Domestic Ubiquitous Computing Environments. UbiComp 2004: 107-124, 2004.

Brandon, et al. Reducing Household Energy Consumption: A Qualitative and Quantitative Field Study. Journal of Environmental Psychology: 75-85, 1999.

Brumitt, et al. EasyLiving: Technologies for Intelligent Environments. Proceedings of the International Symposium on Handheld and Ubiquitous Computing: 12-29, 2000.

Chen, et al. Bathroom Activity Monitoring Based on Sound. Pervasive, LNCS 3468: 47-61, 2005.

Chetty, et al. How Smart Homes Learn: The Evolution of the Networked Home and Household. UbiComp 2007: 127-144, 2007.

Darby. Making it Obvious: Designing Feedback into Energy Consumption. Proceedings of the Second International Conference on Energy Efficiency in Household Appliances and Lighting: 11 pp., 2000.

Darby. The Effectiveness of Feedback on Energy Consumption: A Review for DEFRA on the Literature on Metering, Billing and Direct Displays. Environmental Change Institute: 21 pp., 2006.

(56) References Cited

OTHER PUBLICATIONS

End-User-Deployable Whole House Contact-Less Power Consumption Sensing. UbiComp 2009: 4 pp., 2009.
Evans, et al. Flow Rate Measurements Using Flow-Induced Pipe Vibration. Journal of Fluids Engineering, vol. 126, No. 2: 280-285, 2004.
Fischer. Feedback on Household Electricity Consumption: A Tool for Saving Energy? Energy Efficiency: 79-104, 2008.
Fogarty, et al. Sensing from the Basement: A Feasibility Study of Unobtrusive and Low-Cost Home Activity Recognition. UIST'06, Switzerland, Oct. 15-18, 2006.
Fogarty, et al. Sensing from the Basement: A Feasibility Study of Unobtrusive and Low-Cost Home Activity Recognition. UIST 2006: 91-100, 2006.
Froehlich, et al. HydroSense: Infrastructure-Mediated Single-Point Sensing of Whole-home Water Activity. Ubicomp 2009: 235-244, 2009.
Froehlich, et al. Sensing Opportunities for Personalized Feedback Technology to Reduce Consumption. UW CSE Technical Report: CSE Sep. 13, 2001: 7 pp., 2009.
Froehlich, et al. The Design of Eco-Feedback Technology. CHI 2010: 10 pp., 2010.
Froehlich. Sensing and Feedback of Everyday Activities to Promote Environmentally Sustainable Behaviors. Thesis Proposal, Computer Science and Engineering University of Washington: 35 pp., 2009.
Hirsch, et al. The ELDer Project: Social, Emotional, and Environmental Factors in the Design of Eldercare Technologies. Conference on Universal Usability 2000: 72-79, 2000.
Horst. Whirlpool Corporation: Woodridge Energy Study and Monitoring Pilot. 1-99, 2006.
Kempton, et al. The Consumer's Energy Analysis Environment. Energy Policy, vol. 22, No. 10: 857-866, 1994.
Kim, et al. ViridiScope: Design and Implementation of a Fine Grained Power Monitoring System for Homes. UbiComp 2009: 245-254, 2009.
Kim, et al., NAWMS: Nonintrusive Autonomous Water Monitoring System. SensSys '08 309-321, Nov. 5-7, 2008.
Koile, et al. Activity Zones for Context-Aware Computing. UbiComp 2003: 90-106, 2003 0.
Lester, et al. A Hybrid Discriminative/Generative Approach for Modeling Human Activities. International Joint Conference on Artificial Intelligence: 766-772, 2005.
Lowenstein, et al. Disaggregating Residential Hot Water Use, American Society of Heating, Refrigerating, and Air-Conditioning Engineers (ASHRAE) Transactions: Symposia 1019-1027, 1996.
Mayer. Residential Water Use and Conservation Effectiveness: A Process Approach. University of Colorado & Department of Civil, Environmental, and Architectural Engineering 153pp., 1995.
Mountain. Price Influences Demand. DeGroote School of Business, McMaster University: 16 pp., 2008.
Oppenheim, et al. From Frequency to Quefrency: A History of the Cepstrum. IEEE Signal Processing Magazine, vol. 21, No. 5: 95-106, 2004.
Orr, et al. The Smart Floor: A Mechanism for Natural User Identification and Tracking. CHI 2000: 275-276, 2000.
Parker, et al. Contract Report: Pilot Evaluation of Energy Savings from Residential Energy Demand Feedback Devices. Florida Solar Energy Center, A Research Institute of the University of Central Florida: 32 pp., 2008.
Patel, et al. PowerLine Positioning: A Practical Sub-Room-Level Indoor Location System for Domestic Use. UbiComp 2006: 441-458, 2006.
Patel, et al. At the Flick of a Switch: Detecting and Classifying Unique Electrical Events on the Residential Power Line. UbiComp 2007: 271-288, 2007.
Patel. Bringing Sensing to the Masses: An Exploration in infrastructure-Mediated Sensing. Intel Labs: 133 pp., 2008.
Philipose, et al. Inferring Activities from Interactions with Objects. Pervasive computing, vol. 3, No. 4: 50-57, 2004.
Rowan, et al. Digital Family Portrait Field Trial: Support for Aging in Place. CHI 2005: 512-530,2005.
Study Finds Elder Care a Growing Emotional and Financial Burden for Baby Boomers—New ADT Monitoring Service for Elderly Helps Ease the Stress of Long Distance Care Giving. PR Newswire: 4 pp., 2005.
Summary: The Impact of Real-Time Feedback on Residential Electricity Consumption: The Hydro One Pilot. 4 pp., 2006.
Tapia, et al. Activity Recognition in the Home Setting Using Simple and Ubiquitous Sensors. Pervasive, LNCS 3001: 158-175, 2004.
Tapia. et al. The Design of a Portable Kit of Wireless Sensors for Naturalistic Data Collection. Pervasive: 117-134, 2006.
The Value of Disaggregated Feedback. 1 pg., 2005.
Ueno, et al. Effectiveness of Displaying Energy Consumption Data in Residential Houses—Analysis on how the Residents Respond. ECEEE 2005 Summer Study—What Works and Who Delivers?: 1289-1299, 2005.
Wilson, et al. Simultaneous Tracking & Activity Recognition (STAR) Using Many Anonymous Binary Sensors. Pervasive: 62-79, 2005.
Wren, et al. Toward Scalable Activity Recognition for Sensor Networks. LoCA: 168-185, 2006.
Yang, et al. Visual Integration from Multiple Cameras. Proceedings of the Seventh IEEE Workshop on Applications of Computer Vision: 488-493, 2005.
Giurco, et al. Innovative Smart Metering Technology and its Role in End-Use Measurement. Water Efficiency 2008, Gold Coast, Mar. 31-Apr. 2, 2008.
International search report and written opinion dated Apr. 1, 2010 for PCT/US2009/053848.
Office action dated Nov. 1, 2016 for CA Application No. 2,765,089.
Office action dated Dec. 30, 2016 for CN Application No. 201510170954.
Shinozuka, et al., Use of Supervisory Control and Data Acquisition for Damage Location of Water Delivery Systems, Journal of Engineering Mechanics ASCE, Mar. 1, 2005, 131(3):225-230. (Jan. 3, 2005) DOI: 10.1061/(ASCE)0733-9399(2005)131(3):225-230.
Extended European search report and opinion dated Jul. 19, 2017 for EP Application No. 09845941.5.
Office action dated Aug. 31, 2017 for CN Application No. 201510170954.1.

* cited by examiner

| ID | STYLE / BUILT / REMODEL | SIZE / FLOORS / FIXTURES | EXP. TANK / REGULATOR / RECIRCULATING PUMP | WATER HEATER / PLUMBING / STATIC PSI | HYDROSENSE INSTALLATION POINT |
|---|---|---|---|---|---|
| H1 | SINGLE-FAMILY 2002 | 3200 SQFT<br>2 FLR + BAS<br>12 FIXTURES | YES<br>YES<br>NO | TANK<br>PVC<br>46 PSI | HOSE BIB |
| H2 | MULTI-FAMILY 1909 / 1996 | 2160 SQFT<br>2 FLR + BAS<br>5 FIXTURES | NO<br>NO<br>NO | TANKLESS<br>COPPER<br>46 PSI | HOSE BIB |
| H3 | SINGLE-FAMILY 2003 | 4000 SQFT<br>2 FLR + BAS<br>6 FIXTURES | YES<br>YES<br>NO | TANK<br>COPPER<br>41 PSI | HOSE BIB |
| H4 | SINGLE-FAMILY 1921 | 1630 SQFT<br>1 FLR + BAS<br>4 FIXTURES | NO<br>NO<br>NO | TANK<br>GALVANIZED<br>43 PSI | HOSE BIB |
| H5 | SINGLE-FAMILY 1913 | 2000 SQFT<br>2 FLR + BAS<br>5 FIXTURES | NO<br>NO<br>NO | TANK<br>COPPER<br>55 PSI | HOSE BIB |
| H6 | SINGLE-FAMILY 1974 / 1985 | 3100 SQFT<br>2 FLR<br>8 FIXTURES | YES<br>YES<br>YES | TANK<br>GALVANIZED<br>46 PSI | HOSE BIB |
| H7 | APARTMENT 1927 | 746 SQFT<br>1 FLR<br>5 FIXTURES | NO<br>YES<br>NO | TANK<br>COP + GAL<br>33 PSI | WATER HEATER |
| H8 | SINGLE-FAMILY 1922 / 2006 | 3650 SQFT<br>2 FLR + BAS<br>3 FIXTURES | YES<br>YES<br>YES | TANK<br>COPPER<br>75 PSI | UTILITY SINK FAUCET |
| H9 | SINGLE-FAMILY 1904 / 1995 EST. | 1790 SQFT<br>2 FLR + BAS<br>4 FIXTURESS | NO<br>NO<br>NO | TANK<br>COPPER<br>72 PSI | HOSE BIB + WATER HEATER |

130

*FIG. 4*

| Home | Fixture Open Identification | Fixture Close Identification |
|---|---|---|
| H1 (12 valves) | 100% | 100% |
| H2 (8 valves) | 96.4% | 100% |
| H3 (6 valves) | 100% | 100% |
| H4 (5 valves) | 96.2% | 100% |
| H5 (9 valves) | 100% | 100% |
| H6 (8 valves) | 100% | 90.0% |
| H7 (8 valves) | 100% | 100% |
| H8 (6 valves) | 92.0% | 84.0% |
| H9 (7 valves) | 97.1% | 97.1% |
| Aggregate | 97.4% | 93.8% |
| | 95.6% | |

*FIG. 6*

| Fixture Type (number of fixtures) | Fixture Open Identification | Fixture Close Identification |
|---|---|---|
| Sinks (25 in 9 homes) | 98.5% | 92.3% |
| Toilets (13 in 9 homes) | 100% | 100% |
| Showers (7 in 7 homes) | 94.6% | 92.9% |
| Bathtubs (3 in 3 homes) | 100% | 100% |
| Clothes Washer (2 in 2 homes) | 100% | 100% |
| Dishwasher (1 in 1 home) | 100% | N/A |

*FIG. 7*

| Home | Avg Error (GPM) | Stdev Error (GPM) | Avg Error (%) | Stdev Error (%) |
|---|---|---|---|---|
| H1 (7 valves) | 0.17 | 0.13 | 7.3 | 6.7 |
| H4 (6 valves) | 0.19 | 0.17 | 5.6 | 5.3 |
| H5 (8 valves) | 0.13 | 0.11 | 4.5 | 5.5 |
| H7 (8 valves) | 0.67 | 1.47 | 22.2 | 46.0 |

*FIG. 8*

SENSING EVENTS AFFECTING LIQUID FLOW IN A LIQUID DISTRIBUTION SYSTEM

CROSS-REFERENCE

This application is a continuation of U.S. patent application Ser. No. 13/888,917, filed May 7, 2013, now U.S. Pat. No. 9,250,105, issued on Feb. 2, 2016, which is a continuation of U.S. patent application Ser. No. 12/483,041, filed Jun. 11, 2009, now U.S. Pat. No. 8,457,908, issued on Jun. 4, 2013, the disclosures of each of which are incorporated herein by reference in their entirety.

BACKGROUND

Water is essential to many home activities (e.g., washing, cleaning, cooking, drinking, gardening). In 2008, it was estimated by the Environmental Protection Agency (EPA) that 36 states will face serious water shortages in the next five years. Furthermore, in 2001, the American Water Works Association indicated that only a 15% reduction in water usage across US households would save an estimated 2.7 billion gallons/day and more than $2 billion/year. Adding to the problem is a more recent estimate by the EPA that more than 1 trillion gallons of water leak from the water systems in U.S. homes each year, which accounts for about 10% of the average home's water usage. The leaks can be in worn faucet and toilet valves, as well as leaks in the water lines installed in living structures. Most consumers have no mechanism to accurately measure their household water usage other than total consumption indicated on a monthly (or bi-monthly) water bill, which are based on periodic water meter readings. Further, the leaks occurring in household water systems often go undetected, since they are not evident to residents in a home. In order to better conserve water and stop leaks, it will be necessary to provide residents with information related to the water consumed with each type of water consumption activity, from washing a load of clothes in a washer, to taking a shower or flushing a toilet.

Previous work that was directed toward monitoring home water usage created an approach that has several drawbacks. For example, this earlier approach used microphones pressed against an exterior of specific water pipes in a residence, including a cold water inlet, a hot water inlet, and a waste water exit, to demonstrate recognition of several important activities based on patterns of water use, such as the series of fill cycles associated with a dishwasher. This earlier technique was unable to reliably differentiate among multiple instances of water usage by similar fixtures (e.g., the opening or closing of valves at each of multiple sinks or the flushing of multiple toilets within a home), could not reliably identify concurrent activities (e.g., a toilet flush while a person is showering), and did not attempt to estimate the volume of water being used by the water system during water consuming activities. There are also significant difficulties in using the audio-based sensors due to ambient noise (e.g., noise produced by an air conditioning unit that is installed in close proximity to a sensor placed on a home's hot water heater). In addition, this prior approach did not enable leaks to be detected at specific fixtures.

In several industrial applications, such as irrigation systems, sensors providing high-granularity flow rate monitoring have been used, but these prior art approaches are either prohibitively expensive for residential use (e.g., from about $2,000 to about $8,000 for a single ultrasonic or laser Doppler velocimetry sensor) or require a professional installation by a plumber of multiple inline flow sensors. An inline flow sensor is installed for each fixture of interest by cutting into existing pipes. It has also been shown in a laboratory environment that accelerometers mounted on the exterior of water pipes produce a signal having a strong deterministic relationship to water flow rate, but this effect is highly sensitive to pipe diameter, material, and configuration. Others have proposed using a home's existing aggregate water flow meter together with a network of accelerometers on pipes to infer flow rates throughout a home. However, all of these prior art approaches require placement of multiple sensors along or in water pipe pathways that are uniquely associated with each fixture of interest (i.e., they are distributed direct sensing methods that cannot use a single sensor to monitor all of the fixtures in a structure water system).

It is therefore evident that it would be desirable to employ a better method and system for monitoring water flow to each of a plurality of different fixtures in a residence or multi-living unit structure that is low in cost and easily installed without using a plumber. Such a system and method should enable water usage or volumetric flow occurring at each fixture to be readily determined. In addition, it would also be desirable to employ such a system and method to detect water leakage at specific fixtures or points in a water system of a structure, so that a location of at least certain types of the leaks can be identified, to facilitate correcting the condition that has caused the leak.

SUMMARY

This application specifically incorporates by reference the disclosures and drawings of each patent application and issued patent identified above as a related application.

An exemplary novel method has thus been developed as described below, for monitoring a flow of a liquid in a distribution system within a structure. As used herein, the term "structure" is intended to encompass not only living structures such as houses, multi-unit living quarters (such as duplexes), condominiums, townhouses, apartments, hotels, motels, etc., but also should be understood to include any facility that includes a system of pipes or conduits for distribution of liquids, such as a refinery, a chemical manufacturing facility, and a brewery, to name a few examples without any intended or implied limitation. This exemplary method includes the steps of monitoring a liquid pressure at a first point in the distribution system, and in response thereto, producing an output signal indicative of pressure in the distribution system. Liquid-related events occurring in the distribution system are then detected based upon changes in pressure, e.g., transient pressure waveforms, indicated by the output signal. Further, a specific type of a liquid-related event that has been detected from among a plurality of different types of events is identified, by comparing characteristics of the output signal with determinative criteria associated with the plurality of different types of events.

A plurality of different valves are typically coupled to the distribution system. Accordingly, the step of detecting liquid-related events can include employing the output signal for detecting a change in state of one or more of the valves, i.e., a valve opening more or closing more. The valve that is identified can be associated with a specific fixture from among a plurality of different fixtures that are coupled to the distribution system, so that the specific fixture is thus identified by detecting the valve opening or closing.

The method can further include the step of determining whether the valve associated with the specific fixture has changed state by opening more or closing more.

Some distribution systems may includes a reservoir (e.g., a toilet tank) with a valve that opens automatically if a level of the liquid in the reservoir drops below a predefined level. If so, the method can include the step of detecting a leak from the reservoir by identifying characteristics of a pressure transient waveform that are indicative of a cycle in which the valve controlling a flow of the liquid into the reservoir opens and closes as required to refill the reservoir, to replace liquid that has leaked from the reservoir.

As another function, the method can include the step of automatically determining a volumetric flow rate in the distribution system as a function of both the output signal and a predefined flow resistance for the distribution system. If the distribution system includes a plurality of valves disposed at different points, the method can comprise the steps of empirically measuring the volumetric flow rate at each of a plurality of different points in the distribution system that are at varying distances from an inlet for the distribution system; and, determining the predefined flow resistance for the distribution system at each of the plurality of different points, based upon a change in pressure indicated by the output signal while the volumetric flow rate is being measured. The predefined flow resistance can then be estimated for other points where liquid usage can occur in the distribution system, based upon the predefined flow resistance measured at the plurality of different points.

In some applications, the liquid distribution system can include an inline liquid volumetric flow detector, e.g., a water meter. In this case, the method can further include the steps of using the inline liquid volumetric flow detector to successively determine a volumetric flow rate at each of a plurality of different points in the distribution system. The volumetric flow rate is measured as a valve at the point is opened for a period of time and then closed. The predefined flow resistance for the distribution system is then determined at each of the plurality of different points, based upon the volumetric flow rate measured while the valve at that point was open. A relatively low-flow leak in the distribution system can be detected by using the liquid volumetric flow detector to detect a flow of the liquid in the distribution system for an extended period of time during which none of the valves in the distribution systems were determined to have been open. Any flow that is measured must thus result from the slow leak, since none of the liquid should be passing through nominally closed valves.

The step of identifying a specific type of event that has been detected can comprise the steps of determining a predefined transient pressure wave signature for each fixture that is coupled to the distribution system, and storing or otherwise saving the predefined transient pressure wave signatures. A transient pressure wave signature indicated by the output signal can then be compared to the predefined transient pressure wave signatures that were stored or saved, and a specific fixture where liquid flow has changed can be determined by identifying the fixture having the predefined transient pressure wave signature that most closely matches the transient pressure wave signature indicated by the output signal, and based upon a location of the specific fixture in the distribution system.

The step of identifying a specific type of liquid-related event that has been detected can comprise the step of segmenting the output signal to isolate discrete events, based on pressure changes in the distribution system. Each discrete event that is detected can then be classified as either a valve open or a valve close event. Also, each valve open or valve close event can further be classified according to a specific fixture that generated it.

The step of segmenting can include the steps of filtering the output signal to produce a smoothed output signal, and determining a derivative of the smoothed output signal. The smoothed output signal and its derivative can then be analyzed in a sliding window to detect a beginning of a valve event based upon at least one condition. The possible conditions include those in which the derivative of the smoothed output signal exceeds a predefined first threshold relative to static pressure in the distribution system, or in which the difference between a maximum pressure value and a minimum pressure value in the sliding window exceeds a predefined second threshold relative to the static pressure in the distribution system. The derivative of the smoothed output signal can further be analyzed to detect an end of a valve event based upon a change in a sign of the derivative and a magnitude of a change in the derivative. The step of classifying each discrete liquid-related event that is detected as either a valve open or a valve close event can be based on an occurrence of a condition selected from the group of conditions, including: (a) a magnitude of a difference in the smoothed pressure at the beginning and the end of a valve event exceeding a third predefined threshold relative to the static pressure in the distribution system, wherein a decrease in the smoothed pressure between the beginning and the end of the valve event indicates a valve open event, and an increase in the smoothed pressure between the beginning and the end of the valve event indicates a valve close event; or, (b) based on an average value of the derivative of the smoothed pressure between the beginning of the valve event and a first extreme of the derivative, wherein a positive average value of the derivative indicates a valve open event, and a negative average value of the derivative indicates a valve close event.

The method can include the step of associating valve open and valve close events with specific fixtures using a template-based classifier. In this case, a template having a maximum correlation with the characteristics of the output signal is chosen and identifies the fixture for which an event has been detected. The choice is made after filtering potential templates that can be employed for the classifier according to a plurality of complementary distance metrics. These metrics can include a matched filter distance metric, a matched derivative filter distance metric, a matched real Cepstrum filter distance metric, and a mean squared error filter distance metric. The method can further include the step of determining thresholds used to carry out the step of filtering the potential templates, based on the complementary distance metrics provided in training data. If templates corresponding to a plurality of different fixtures pass all of the filters, a filter can be chosen from among the possible filters based upon a single distance metric that performs best on training data for the fixtures. The chosen filter can then be used in identifying the fixture for which an event has been detected.

The method can optionally include the step of monitoring liquid pressure at a second point in the distribution system, producing another output signal. The second point is spaced apart from the first point. The liquid related events occurring in the distribution system can then be detected based in part upon a time difference between the output signal at the first point and the output signal at the second point. Also, the specific type of liquid-related event that has been detected can be selected from among the plurality of different types of events, based in part upon the time difference.

Another option is to apply a transient pressure pulse to the liquid in the distribution system (for example, by reverse biasing the pressure sensor), and detecting a pressure pulse waveform corresponding to a reflection of the transient pressure pulse in the distribution system. Based upon characteristics of the pressure pulse waveform, one or more of a path of the transient pressure pulse and the pressure pulse waveform through the distribution system, an indication of liquid flow in the distribution system, and/or a state of one or more of the valves in the distribution system can be determined.

Another aspect of the disclosure and claims is directed to a medium including machine readable and executable instructions for carrying out a plurality of functions employed in monitoring a flow of a liquid in a distribution system within a structure when the machine readable and executable instructions are executed by a processor. These functions are generally consistent with the steps of the exemplary method discussed above.

Still another aspect is directed to an exemplary apparatus for monitoring a flow of a liquid in a distribution system within a structure. The apparatus includes a pressure sensor that is adapted to connect to a distribution system to sense a pressure in the distribution system and to then produce an analog signal indicative of the pressure. As used herein, the term "pressure sensor" is intended to be broadly interpreted to include any sensor that responds to liquid pressure phenomena in a pipe or conduit and may include without any implied or intended limitation, a sensor such as a piezoresistive sensor, a strain gauge or other sensor that detects a mechanical deflection of a diaphragm, a micoelectromechanical system (MEMS) sensor, an optical fiber interferometry sensor, a capacitive sensor (e.g., responding to changes in a dielectric distance caused by pressure), an acoustics sensor, and a vibration sensor (e.g., an accelerometer that responds to pressure waveforms). A connector is provided and is sized for coupling the pressure sensor to a fixture (such as a faucet bib) in a structure. An analog-to-digital converter is used for converting the analog signal from the pressure sensor to a digital signal. A micro controller is coupled to the analog-to-digital converter to receive the digital signal and controls acquisition of the digital signal and processes the digital signal to produce an output signal that is used for detecting events occurring in a distribution system, based upon changes in pressure indicated by the output signal. The output signal is used for identifying a specific type of event from among a plurality of different types of events. A communication link can be included for coupling the output signal to a computing device for further processing of the output signal.

Yet another aspect of the disclosure and claims that follow is directed to an exemplary system for monitoring a flow of a liquid in a distribution system within a structure. The system includes components generally consistent with those of the apparatus noted above, and also includes a computing device. The computing device includes a memory that stores machine executable instructions, and a processor that is coupled to the memory for executing the machine executable instructions. Execution of these machine instructions causes the processor to carry out a plurality of functions when the pressure sensor is connected to a distribution system. The functions are generally consistent with the steps of the method discussed above.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein:

FIG. 4 is a graph summarizing data relating to nine residential structures in which the present novel approach was tested;

FIG. 6 is an exemplary table illustrating the percentage of fixture valve open and fixture valve close events that were correctly identified in tests of the present novel approach in the nine residential structures of FIG. 4;

FIG. 7 is an exemplary table illustrating a different view of the results of FIG. 6, wherein the percentage fixture valve open and close events correctly identified is illustrated for each type of fixture in the test residential structures;

FIG. 8 is a table illustrating error data for flow rate determined for open valves in four of the test residential structures indicated in FIG. 4, using the present novel approach;

Figure 14A:
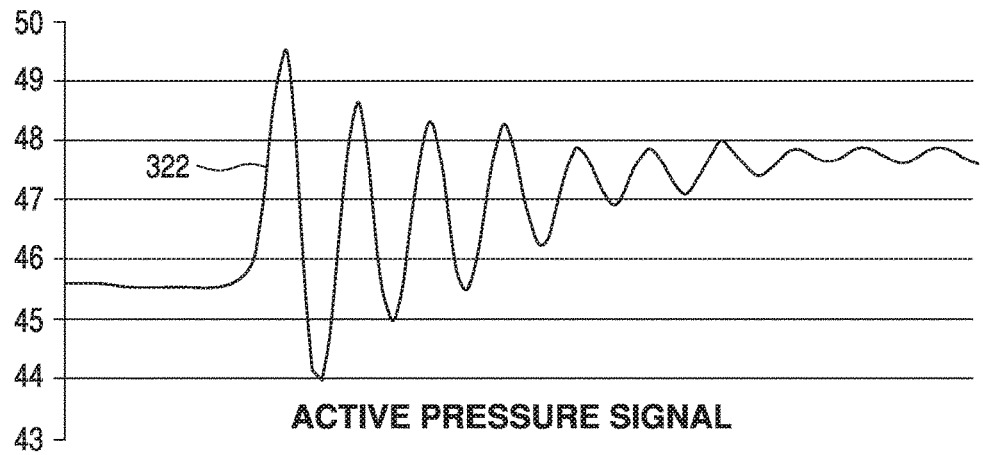
Figure 14B:
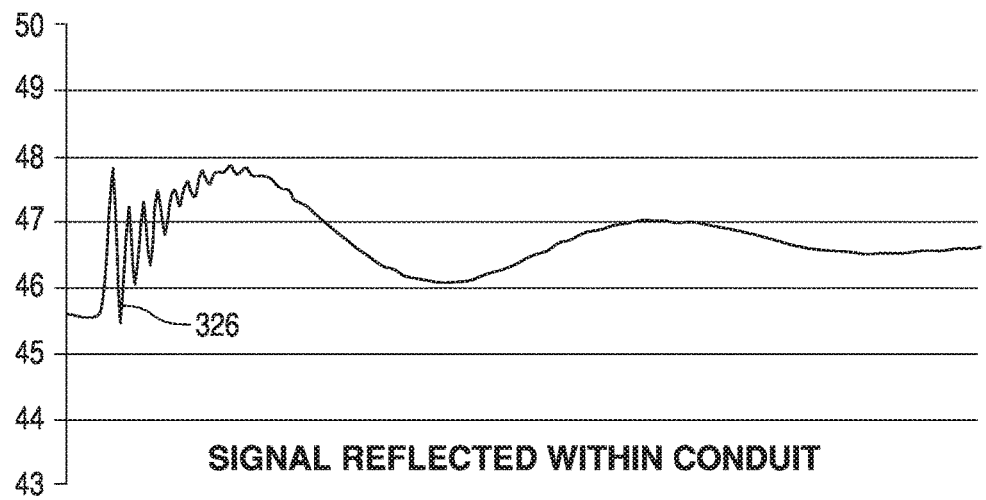
Figure 15:
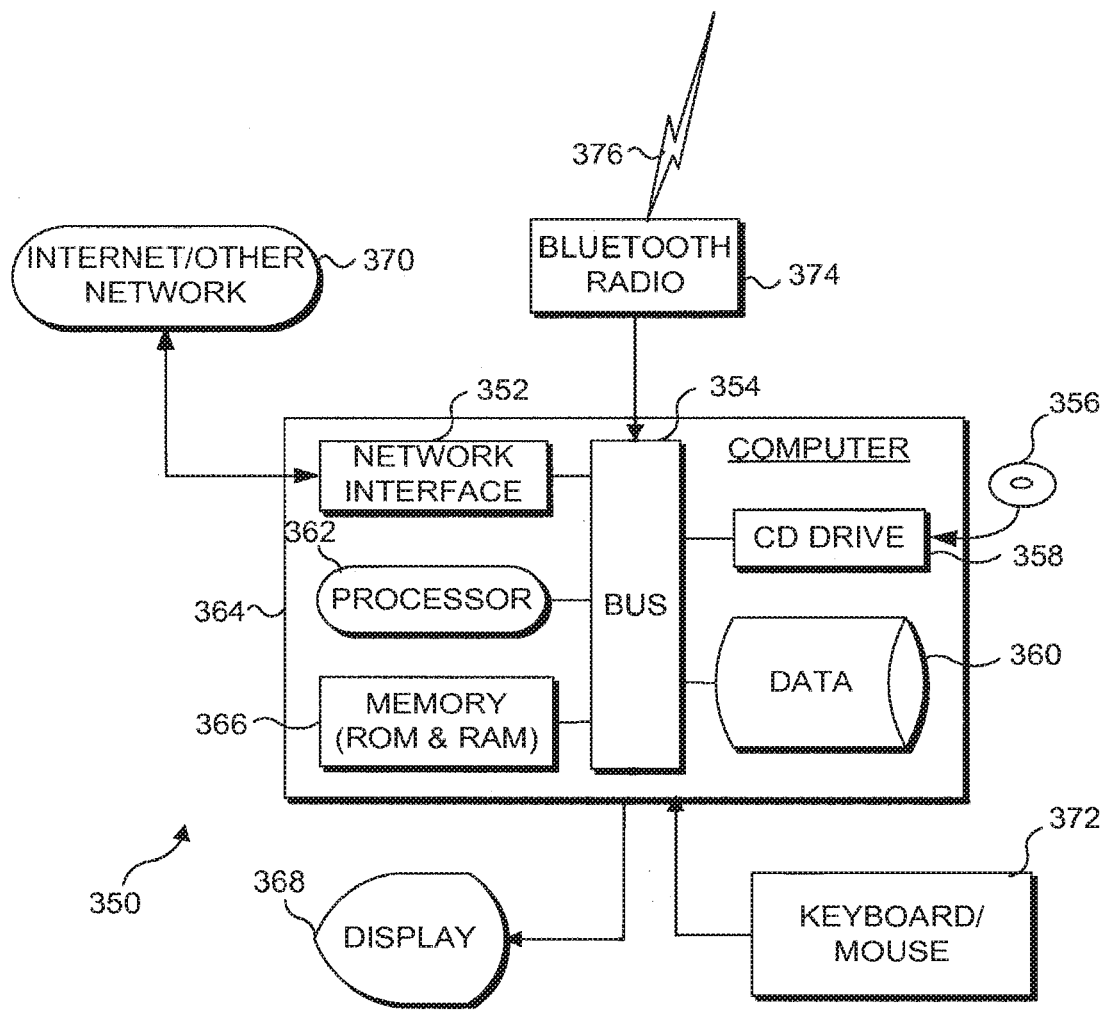

FIG. 14A indicates an active pressure signal that is used as a probe signal, wherein the active pressure signal is generated by a pressure transducer and introduced into a water system of a structure, so that the active pressure signal propagates through the pipes;

FIG. 14B is a reflected pressure signal received from the water system piping, a short time after the active pressure signal of FIG. 14A ended; and FIG. 15 is an exemplary functional block diagram of a generally conventional computing device, such as a personal computer, which is usable for processing the output signal from the pressure sensor and controller of the present novel system.

DESCRIPTION

Figures and Disclosed Embodiments are not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein.
Exemplary System for Monitoring Water Usage Most modern residences are connected to a public water supply or to a private well that provides water under pressure to the inlet of a water system in the residence. Public utilities rely on gravity and pumping stations to distribute water through mains at a sufficient water pressure to meet the requirements for water flow in each home or other type of structure supplied water by the utility. Residences are connected to a water main by a smaller service line, and a water meter is typically disposed at or near this connection. A backflow valve near the water meter prevents water from the structure flowing back into the main. Homes with private wells use a pump to draw the water out of the ground and into a small captive air pressure tank within the home, where it is stored under pressure, so that the pump does not need to run continually when a valve in the water system is opened.

Figure 1:
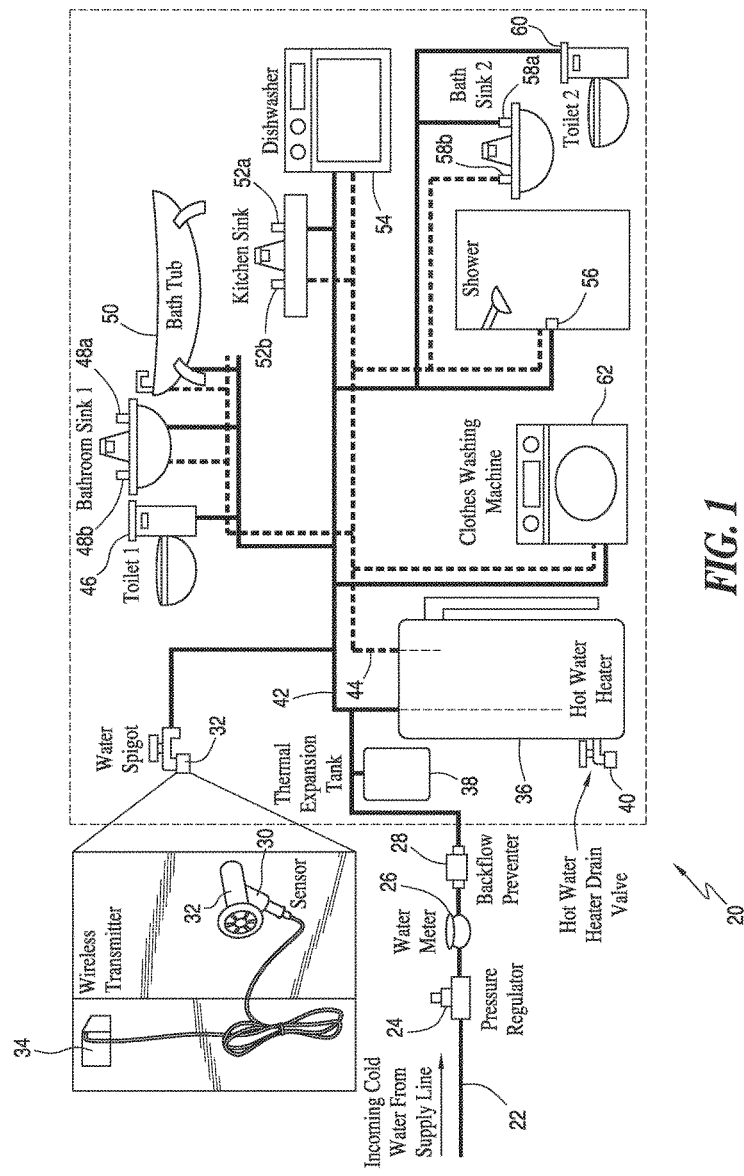
FIG. 1 is an exemplary schematic diagram of a basic water system in a two-bedroom, two-bath residential structure, showing how the present novel approach can be installed at a single point, such as an external hose bib faucet, to monitor water usage during different activities at fixtures in the structure, and to detect leaks that may occur in the water system.

FIG. 1 depicts a typical residential water system 20 for a two-bathroom structure. Cold water enters through a service line 22 that is coupled to the water supply mains (or a private well), typically at 50-100 pounds per square inch (psi) depending on such factors as the elevation of the home and its proximity to a reservoir or pumping station (or other factors if a private well is the source of the water). Many homes have a pressure regulator 24 adjacent to a water meter 26 that protects the home from transients (or pressure spikes) that may propagate from the main and also reduces the incoming water pressure to a level safe for household fixtures and appliances.

Downstream of the regulator, there are two basic layouts found in typical residential piping, series plumbed and branched. Almost all multi-fixture homes have a combination of these two layouts. A cold water supply pipe 42 branches to the individual water fixtures (e.g., to supply water to toilets, sinks, and showers) and also supplies cold water to the supply inlet of a water heater 36. A traditional water heater heats water in an insulated tank using electric resistance elements, or a gas-fired burner (neither shown). When hot water is used, the pressure from the cold water supply line continuously forces the hot water from the hot water tank through a hot water line 44 as the tank refills with cold water. Every hot water tank has a pressure relief valve (not shown) to prevent a possible explosion due to excessive overheating and the resultant steam pressure, as well as a drain valve 40 (important for maintenance, since water heaters should be drained at least once a year to flush mineral deposits and increase operating efficiency). Many homes also have a captive air thermal expansion tank 38 connected near the cold supply inlet of the water heater if the system includes a backflow valve at the water meter and is thus a "closed system." Thermal expansion tank 38 accommodates the thermal expansion of the cold water that is being heated within the water heater after hot water is drawn from the hot water tank. Instead of a hot water tank that retains heated water until needed, some structures use tankless water heaters that provide hot water on demand by rapidly heating the cold water as it passes through a heat exchanger, using heat supplied by electric resistance elements or gas burners. Both types of devices for heating water create a connection between the cold and hot lines of a water system, and the pressure fluctuations monitored in the present approach are propagated through both types of water heaters for both the hot water and cold water portions of a water system.

In this example, a pressure sensor 30 is threaded onto an exterior faucet bib 32. The valve on this faucet is opened so that the pressure sensor is able to respond to the pressure of the water system in the structure, producing a corresponding signal that is processed and transmitted as an output signal to a computing device, as described in greater detail below.

Coupled to the water system in a first bathroom of the structure are a first toilet 46, a first bathroom sink with a cold water valve 48a and a hot water valve 48b, and a bath tub 50 having both cold and hot water valves (neither shown). A kitchen includes a kitchen sink with a cold water valve 52a and a hot water valve 52b, and a dishwasher 54 (having hot and cold water electro-mechanical solenoid valves—neither shown). In a second bathroom are a shower 56 (with hot and cold water valves—not shown), a second sink with a cold water valve 58a and a hot water valve 58b, and a second toilet 60. The structure further includes a clothes washing machine 62, which also includes electro-mechanical solenoid valves (not shown) controlling both hot and cold water flow from the water system.
Identifying Water Fixtures The water system forms a closed loop pressure system, with water being held at a stable pressure throughout the piping when no water is flowing in the water system. Structures with a pressure regulator will have a substantially stable pressure unless the supply pressure drops below the regulator's set point. Structures without a pressure regulator may experience occasional minor changes in water pressure depending on neighborhood water demands on the main supply line, which are detected as fluctuations in the pressure of water in the water system of a structure.

Figure 2A:
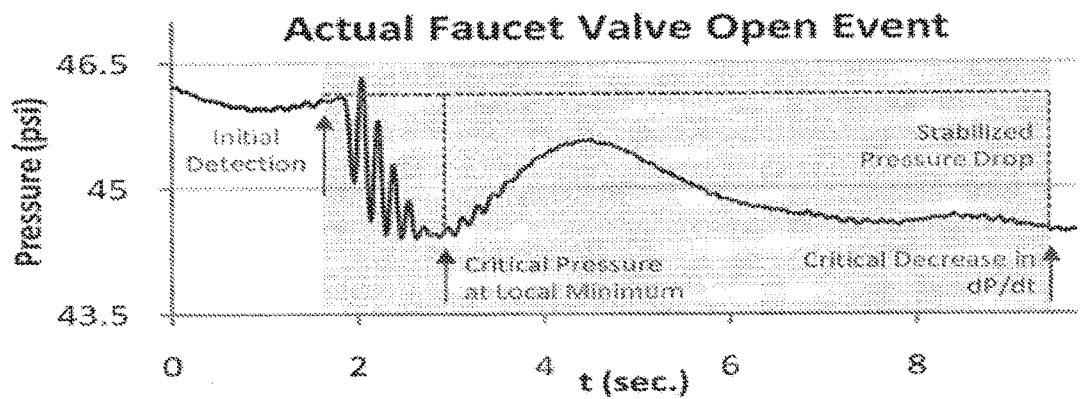
FIG. 2A is an exemplary graph showing a characteristic pressure (psi) vs. time (sec.) response detected using the present novel approach during a valve open event, which is identified as the opening of a kitchen faucet in a residential structure.
Figure 2B:
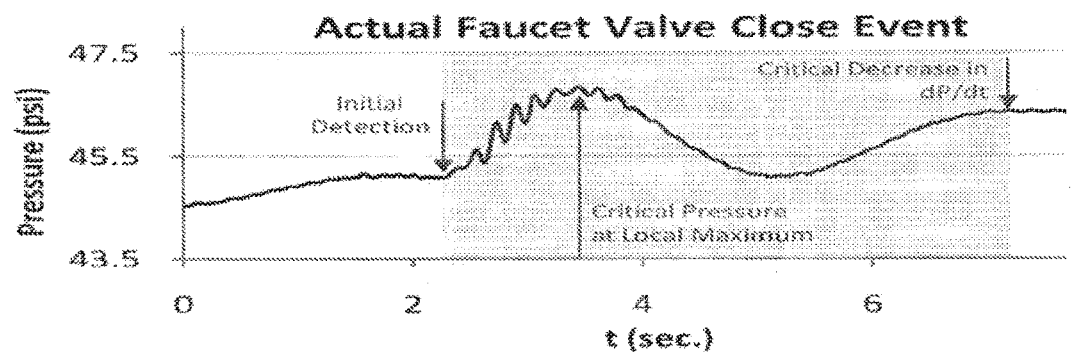
FIG. 2B is an exemplary graph showing a characteristic pressure (psi) vs. time (sec.) response detected using the present novel approach during a valve close event, which is identified as the closing of the kitchen faucet that was opened in FIG. 2A.

When a valve is opened or closed (whether it a bathroom or kitchen faucet or an electro-mechanical solenoid valve in a dishwasher or clothes washing machine), a pressure change occurs, and a transient pressure wave impulse is generated in the water system (as shown respectively in graphs 100 and 102 in FIGS. 2A and 2B). Transient pressure is a wave phenomenon that results from a rapid change of water velocity in a pipeline (similar to electrical transients on a power line). The transient pressure wave occurring when a valve is rapidly opened or closed is often referred to as a surge or water hammer and can sometimes create a loud hammering or audible noise as the pressure shockwave travels through pipes. The magnitude of the transient pressure surge is both independent of and much greater than the operating pressure. The transient pressure pulse can be either positive or negative, depending on the positive or negative rate of change of pressure (i.e., whether a valve is being opened or closed in the water system). Appliances such as dishwashers or clothes washers control their electromechanical solenoid valves so that they change state rapidly and thus often create the most pronounced water hammer. In contrast, a faucet valve that is opened or closed rather slowly produces less of a water hammer pulse.

An abrupt change in flow can create dangerously high transients that exceed the safe operating pressure limits for residential pipes. Thermal expansion tank 38 (FIG. 1) offers some, but not complete, dampening of these transients. In some water systems, air-filled standpipes are installed adjacent to the input lines to a wash machine or dish washer to provide local dampening of the transients. The change in state of most valves manifests as a water hammer impulse that is harmless, but which can be detected by a pressure sensor installed on the water system. Water hammer waveforms typically last several seconds, as the transient pressure wave oscillates back and forth through the pipes. Using the present approach, the water hammer effect can be detected anywhere within the water system (even with dampeners installed), thus enabling single-point sensing of effects throughout the water system.

The present approach relies on the fact that a unique pressure transient or water hammer signature sensed for a particular fixture depends on the valve type and its location in the structure's water system. The ability of the present approach to detect a location of an event provides great discriminative power, making it possible to distinguish between two fixtures of the same model (e.g., between events occurring at two of the same toilets in the house) and even between two valves in the same fixture (e.g., between the hot and cold water valves in a sink fixture) because their pressure wave impulses traverse different paths through the pipe infrastructure of the water system before reaching the pressure sensor. The magnitude of the pressure drop and resulting shockwave are dependent on a relative location of the pressure sensor to the source of the event, but the shape of the signature does not change. As discussed below, it is also contemplated that a plurality of pressure sensors might be installed at disparate points in the water system, so that a time difference between the transient pressure waveforms being detected by the pressure sensors can provide additional information useful to identify an event and the location of the fixture with which the event is associated.

Estimating Flow

Changes in pressure and the rate of a pressure transient onset enables accurate detection of valve open and valve close events. Pressure can also be used to measure flow rate in the water system, which is analogous to an electrical circuit, where knowing the resistance (i.e., pipe restrictions, bends, etc., which cause flow resistance) and the change in voltage (i.e., pressure) enables a determination of the electrical current (i.e., flow rate).

Flow rate is related to pressure change via Poiseuille's Law (also referred to as the Hagen-Poiseuille equation), which states that the volumetric flow rate of fluid in a pipe Q is dependent on the radius of the pipe r, the length of the pipe L, the viscosity of the fluid $\mu$ and the pressure drop $\Delta P$:

$$Q = \frac{\Delta P \pi r^4}{8 \mu L}. \quad (1)$$

Eq. (1) can be simplified by the fluid resistance formulation, which states that the resistance to flow is proportional to the drop in pressure divided by the volumetric flow rate.

$$R_f = \frac{\Delta P}{Q} \equiv \frac{8 \mu L}{\pi r^4}. \quad (2)$$

Thus, it is possible to use fluid resistance to abstract some of the variable complexity from Poiseuille's Law, resulting in the simple formula:

$$Q = \frac{\Delta P}{R_f}. \quad (3)$$

The present novel approach measures the change in pressure $\Delta P$ when a valve is opened or closed. In order to compute Q, it is necessary to estimate the remaining unknown, $R_f$. In this case, $R_f$ is bounded by two factors: water viscosity and pipe length, L. Water viscosity can easily be calculated as a function of the water temperature and based on the fact that the internal diameter of most residential pipes are either ¼" or ⅜". Thus, L, the length of the pipe, is the main unknown and will change depending on the water fixture being used, since each path from the inlet of a water system, to each different fixture in the structure, is typically different.

These equations are not comprehensive. For example, they do not account for variations in the smoothness of the inner pipe surface, the number of bends, valves, or constrictions in the pipes, nor pipe orientation (e.g., effects caused by the force of gravity and changes in barometric pressure). However, these effects can be treated as negligible for residential pipe networks. The estimate for $R_f$ can be simplified for each residence by sampling the flow rate at strategic locations (so as to vary the distance from the water system inlet to the structure), and based on a few measurements of resistance to flow at different valves, provide a reasonably accurate estimate for the resistance for the remaining valves in the structure.

Exemplary Pressure Monitor Design

Figure 3:
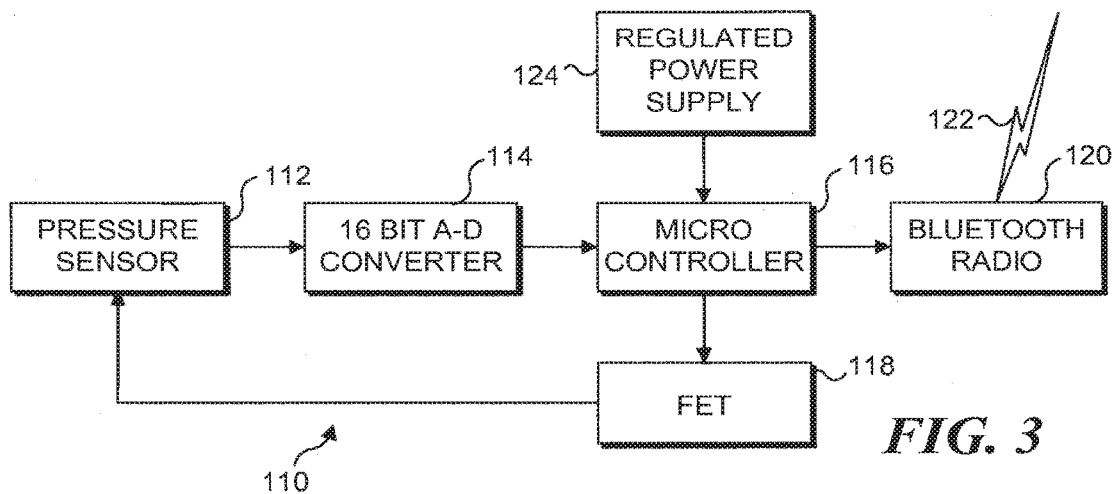
FIG. 3 is a functional block diagram of a pressure sensor and controller that is used in one exemplary embodiment of the present novel approach, in which a Bluetooth radio is employed to transmit an output signal indicative of pressure to a computing device for further processing and classification.

As shown in FIG. 3, an exemplary embodiment of a pressure monitor 110 includes a customized stainless steel pressure sensor 112, a 16-bit analog-to-digital converter (ADC) 114, a microcontroller 116, and a Bluetooth wireless radio 120. The Bluetooth wireless radio transmits an output signal 122 (conveyed as a Bluetooth radio signal) that is indicative of pressure in the water system sensed by pressure sensor 112. (Alternatively, other types of wireless signals such as IEEE 802.11 (WiFi), or a wired communication link (such as an Ethernet or USB line) may instead be used to convey the output signal to a computing device for further processing and storage.) Microcontroller 116 provides a gating signal to close a field effect transistor switch 118 (or other electronic switch) to control the sampling of pressure by pressure sensor 112. A regulated power supply 124 provides direct current (DC) power to energize the entire pressure monitor. The computing device can be a separate computer or can instead be incorporated into the pressure monitor housing. Also, the output signal can be stored on the pressure monitor using a memory. For example, a universal serial bus (USB) memory chip or other type of removable storage memory chip could be employed to store the output signal for subsequent processing when the memory is moved to a computing device. As a further alternative, the memory might be interrogated periodically to move the stored output signal data to a computing device or another memory for subsequent processing.

Two different embodiments of the pressure sensor were employed, including one with a pressure range of 0-50 psi and the other with a pressure range 0-100 psi. The higher dynamic range is useful for monitoring the water pressure in structures with a high supply pressure or when a pressure regulator is not included in the water system for the structure. The pressure sensor used in this exemplary design was a P1600™ series manufactured by Pace Scientific, having a built-in ¼" NPT male connector, which was fitted with a ¾" brass adaptor and sealed using Teflon™ tape. This adaptor enabled the sensor to be easily threaded onto any standard water faucet bib, such as those to which a garden hose might be connected. The pressure sensor has an operating temperature range of −40° F. to 257° F., and a pressure response time of less than 0.5 milliseconds. The theoretical maximum sampling rate is therefore about 2 kHz, but 1 kHz should be more than sufficient for detecting transients and a reasonable rate for the data transfer to a computing device for processing. As noted above, many other types of sensors that are responsive to pressure phenomena might be used in the pressure monitor instead of the Pace Scientific pressure sensor.

The pressure sensor's output is ratiometric to a 5 VDC supply voltage (i.e., the output voltage is a ratio relative to the supply voltage, so that small changes in the supply voltage do not affect the level or accuracy of the output signal). A 16-bit Texas Instruments ADS8344™ ADC and an AVR microcontroller were used in this exemplary pressure monitor, providing a resolution of approximately 0.001 psi for the 0-50 psi pressure sensor and about 0.002 psi for the 0-100 psi pressure sensor. The Bluetooth radio is a Class 1, implementing a serial port profile. This exemplary pressure monitor embodiment was able to reliably sample and stream output signal pressure data over the Bluetooth channel to a conventional personal computer (PC) (like that shown in FIG. 15) at a data rate of about 1 kHz. A 5 V low-drop power regulator chip was used in regulated power supply 124 to regulate the DC voltage from a single 9 V battery to provide power for the pressure monitor components. However, it is contemplated that a battery providing a different voltage, or a different type of battery, or an alternating current (AC) line source power supply or some other power source might instead be used to provide the DC power to energize the components of pressure monitor 110.

Pressure sensor 112 has a mechanical shock rating of over 100 g, making it insensitive to damage due to pipe vibration occasionally caused by some water hammer events. Although the pressure sensor is calibrated and tested for linearity at the factory where it is made, the output of the entire pressure monitoring module was tested by applying known pressures to the pressure sensor. Ten samples were taken with the pressure sensor connected to a pressure-regulated water compressor providing an accurately known water pressure. All measurements were well within the pressure sensor's tolerance of ±0.25% at 25° C. The entire unit is weatherproof and can be installed in damp locations. A current exemplary implementation of the pressure sensor coupling does not offer a pass-through capability (i.e., does not enable the water system fixture where the pressure sensor is connected, to also be connected to a hose or other coupling), but this modification can clearly be implemented by one of ordinary skill, e.g., by using a "T" or a "Y" fitting with the appropriate threaded ends.

Data Collection During Tests in Nine Residential Structures

In order to validate this novel approach, the exemplary pressure sensor module, and the algorithms used to process the output signal from the pressure sensor module, labeled data were collected in nine residential structures, HI-H9, located in three cities. The residential structures were of varying, style, age, and diversity of water systems, as shown in a table 130 in FIG. 4.

For each residential structure, the baseline static water pressure was first measured, and the appropriate pressure sensor (i.e., the 0-50 psi or the 0-100 psi range pressure sensor) was then installed on an available water hose bib, utility sink faucet, or water heater drain valve. Each collection session was conducted by a pair of researchers. One person recorded the sensed pressure signatures on a laptop while the other activated the water fixtures in the structure. The pressure signatures were recorded using a graphical logging tool, which also provided real-time feedback of the pressure data via a scrolling time-series line graph. Five trials were conducted for each valve on each fixture (e.g., five trials for a hot water valve, and five trials for a cold water valve). For each trial, a valve was opened completely for at least five seconds and then closed.

For four of the nine residential structures (HI, H4, H5, and H7), flow rate information was also collected for kitchen and bathroom sink faucet and shower faucet fixtures. In addition to logging sensed pressure, the time required to fill a calibrated container to a volume of one gallon was measured (this method is preferred by water utilities for accurately measuring flow rate). This step was repeated for five trials for each valve. The in-home data collection process yielded a total of 689 fixture trials and 155 flow rate trials across 76 fixtures.

Overview of the Analysis of Fixture Event Identification

After the data were collected, a three-step approach was employed to examine the feasibility of identifying individual fixture events according to unique transient pressure waves that propagated to the pressure sensor from each fixture where the event occurred. Recalling that each valve event corresponds to a pressure transient signal when a valve is either opened or closed, each individual valve event was first segmented from the data stream, and its beginning and end were identified to enable further analysis. Next, each valve event was classified as either a valve open or a valve close event. Finally, the valve event was classified according to the specific fixture that generated it. Initially, only events that occurred in isolation were identified. The analysis of compound (overlapping) events is discussed below.

Valve Event Segmentation

Figure 5:
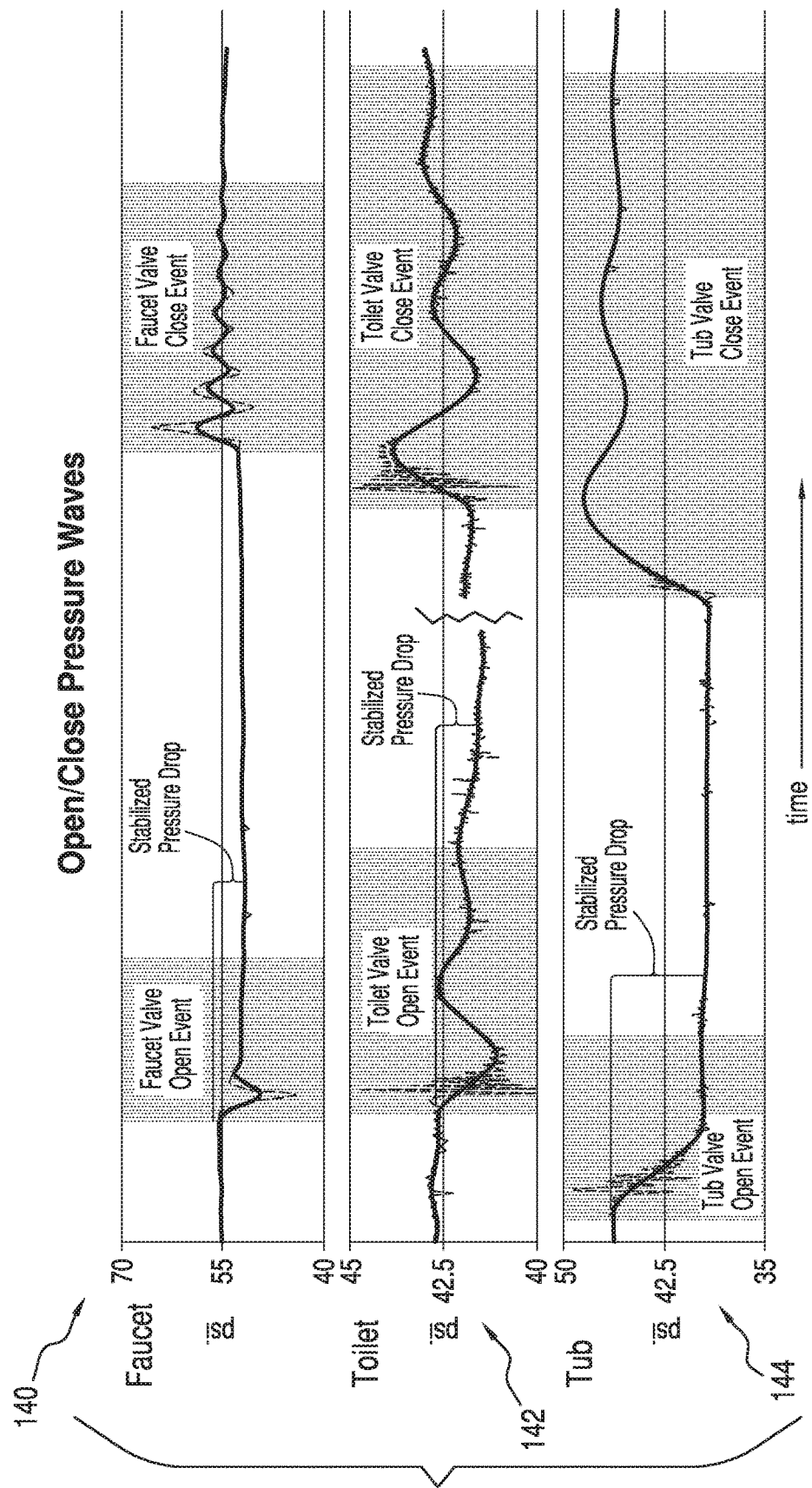
FIG. 5 are three graphs illustrating exemplary valve open and close pressure waves (pressure vs. time) respectively for a faucet, a toilet, and a tub, wherein a valve at the respective fixture was opened, remained open for an interval of time, and was then closed.

Before analyzing the characteristics of a valve event, the event must first be segmented (i.e., isolated) from the pressure sensor output signal. Segmentation must be effective for many different types of events, and so, it is important to consider only those features of the output signal from the pressure sensor that are likely to be most typical of all valve events. The approach that was used is illustrated in graphs 140, 142, and 144 in FIG. 5 (and is also illustrated in graphs 100 and 102 in FIGS. 2A and 2B). In an exemplary method, the raw output signal is smoothed using low pass, linear phase finite impulse response filters (e.g., a 13 Hz low pass filter and a 1 Hz low pass filter). The smoothed output signal from the 13 Hz low pass filter and a derivative of the smoothed output signal from the 1 Hz low pass filter are then analyzed in a sliding window of 1000 samples (corresponding to one second of sensed pressure).

The beginning of a valve event corresponds to one of two conditions. The most common is when the derivative of the smoothed pressure sensor output signal exceeds a specified threshold relative to static pressure, indicating a rapid change (for example, a derivative approximately equal to 2 psi/sec may be required for a residential structure water system having 45 psi static pressure, scaled by the actual static pressure of the structure water system). A less common second condition is detected when the difference between maximum and minimum values in the sliding window exceeds a threshold relative to the static pressure, indicating a slow but substantial change (for example, approximately 1 psi difference may be required for a residential structure having a 45 psi static pressure, scaled by the actual static pressure). After the beginning of a valve pressure event is detected via either method, the next change in the sign of the derivative represents the extreme of this valve event relative to the preceding static pressure (which may be either a maximum or a minimum).

The end of a segmented valve event can then be detected as a first point at which an extreme of a fluctuation (i.e., a change in a sign of the derivative) is less than a predefined percentage (e.g., 5%) of the magnitude of the first extreme following the beginning of the event. It is also possible for an event to end with a rapid increase in the magnitude of a fluctuation, which corresponds to the occurrence of a compound (or overlapping) event, as discussed below in greater detail. Applying this method to the data collected in a residential structure yielded appropriate segmentations of 100% of the valve events from their surrounding pressure output signal data stream.

Classifying Valve Open and Valve Close Events

After segmenting each valve event, the valve event is classified as either a valve open or a valve close event. A valve open event corresponds to a valve opening more, while a valve close event corresponds to a valve closing more. Valve can open fully from a fully closed state, or can close fully from a fully open state, or can simply open more or close more than previously was the case. A classifier is applied that first considers the difference in the smoothed pressure at the beginning and the end of the segmented event. If the magnitude of this difference exceeds a threshold (for example, 2 psi for a residential structure having a 45 psi static pressure, scaled by the actual static pressure), the event can be immediately classified (a pressure decrease corresponds to a valve open and a pressure increase to a valve close event). Otherwise, the event is classified according to the average value of the derivative between its beginning and its first extreme. A valve open event creates an initial pressure decrease (a positive average derivative), while valve close events create an initial pressure increase (a negative average derivative). Applying this method to the segmented valve events from the data that were collected from the residential structures resulted in a 100% correct classification of valve open and valve close events.

Fixture Classification

Valve open and valve close events can be associated with specific fixtures in a structure using a template-based classifier. When classifying an unknown event, the potential templates are first filtered according to four complementary distance metrics.

A first distance metric that is used is a matched filter, which is very common in signal detection theory. A matched filter is an optimal detection mechanism in the presence of additive white noise. Its primary limitation is that the pressure transient signals that are to be differentiated are not orthogonal. Making these signals orthogonal would require specific knowledge of the source of each event, which is exactly the information that needs to be inferred.

The second distance metric is a matched derivative filter that is included because the derivatives of the events always resemble exponentially decreasing sinusoids. It is therefore reasonable to conclude that the derivatives are more orthogonal than the original pressure signals, and that this matched derivative filter might provide value distinct from the simple matched filter.

The third distance metric is based on the matched real Cepstrum filter, which is the inverse Fourier transform of the natural log of the magnitude of an event's Fourier transform. This metric attempts to approximate the original version of a signal that has been run through an unknown filter Gust as the valve event that is being classified has been transformed by propagation of the pressure transient signal through an unknown path in a structure's water pipes). The approach has definite limitations, but it can be shown that the lower coefficients of the Cepstrum result largely from the transfer function (an event's propagation through a structure's pipes) and the higher coefficients largely from the source (the original valve open/close event). The primary interest is in the transfer function (in part because it allows differentiating among multiple instances of identical fixtures in a home), and so the Cepstrum is truncated to include only the lower coefficients. The resulting space is highly orthogonalized, yielding a third effective and complementary matched filter.

Finally, the fourth distance metric is a simple mean squared error (i.e., a Euclidean distance), which is computed by truncating the longer of two events detected in the water system, based on the pressure sensor output signal.

Similarity thresholds that are used to filter potential templates based on these distance metrics can be learned from training data (i.e., this step provides for filtering templates whose similarity to the unknown event are less than a minimum within-class similarity that has been observed in the training data). If no template passes all four filters in regard to an event that has been detected, the unknown event is not classified. In this case, an application might, for example, ignore the event, prompt a person to label an unrecognized fixture, or determine if the unrecognized event indicates the presence of a leak. If templates corresponding to multiple different fixtures pass all four of the distance metric filters, a nearest-neighbor classifier defined by the single distance metric that performs best on the training data is chosen from among these templates. The single distance metric for the nearest neighbor classifier is chosen based upon the area under a within-class vs. out-of-class receiver operating characteristic (ROC) curve.

Fixture Classification Evaluation

Fixture classification is evaluated using an experimental design selected to demonstrate the robustness of learned model parameters across the multiple residential structures in the collected test data. Specifically, a cross-validation experiment was conducted that relates the data according to the specific residential structure in which the data were collected. There were nine trials in the cross-validation, with each trial using data from one residential structure as the test data and data from the other eight residential structures as training data. After learning model parameters from the test data (i.e., the four similarity filter thresholds and the choice of the distance metric for the final nearest-neighbor classifier), each event in the test residential structure was tested using a "leave-one-out method." Each test residential structure event can then be classified using the other events as templates, together with the learned model parameters from the training data.

FIG. 6 presents the results of this evaluation in a table 150. The accuracy of fixture-level identification of valve open and valve close events within each home (and thus each test fold of the cross-validation), as well as the aggregate 95.6% accuracy of fixture-level classification. FIG. 7 includes a table 160 that presents a different view on the same data, showing the accuracy of fixture-level classification for different types of fixtures across all of the residential structures. The overall fixture-level classification across all structures is well above 90%, including a number of cases where the classification accuracy is 100%. Of particular note is the ability of the present novel approach to reliably distinguish among valves opening and closing at different sinks within a residential structure. The test dataset contains only a few instances of clothes washer or dishwater use, in part due to time constraints during the test data collection and in part because it has been shown by others in the prior art that these fixtures can be easily recognized by their highly-structured cycles of water usage (which can also be combined with the present novel approach). However, the present novel approach is both independent of the number of fill cycles, which is important, for example, if a dishwasher is sometimes run with an extra pre-rinse or with other cycle variations, and enables recognition of the appliance that is in use as soon as a valve on any of these appliances is opened and they first use water (in contrast to being able to recognize the appliance only after their structured pattern of fill cycles becomes apparent over time).

Analysis of Flow Estimation

As discussed above, the volumetric flow rate Q is proportional to the change in pressure ΔP divided by a resistance variable $R_f$.

$$Q = \frac{\Delta P}{R_f}$$

The change in pressure ΔP is calculated automatically by measuring the difference between the pressure at the onset of a detected valve open event, and the stabilized pressure at the end of the segmented valve open transient pressure wave impulse. The resistance variable $R_f$ cannot be directly measured, but it can be empirically determined by capturing ground truth flow rate information together with the corresponding change in pressure for each valve in a structure. The following discussion considers two scenarios with regarding to learning $R_f$. In the first scenario, it is assumed that a single calibration of flow is done for every valve of interest in a structure. In the second scenario, an attempt is made to use information from the calibration of only some of the valves in the structure, to estimate $R_f$ at the other valves that have not been calibrated.

Individually Calibrated Valves

It is not unreasonable to imagine that the process of installing a system like that discussed herein might include a single calibration for each fixture in a structure. In this first scenario, by performing this empirical determination, each valve in the home can be labeled with a known $R_f$ value that can subsequently be used with a sensed pressure change in the water system, ΔP, to estimate water flow at the valve when it is open.

The accuracy of the flow estimation that might be obtained in this scenario was examined using a cross-validation experiment to analyze the five calibrated container trial datasets collected for each of the faucet and shower fixtures in residential structures HI, H4, H5, and H7 (as discussed above). Each trial in the cross-validation used a single calibrated container test to infer a resistance variable $R_f$ for a valve of the fixture. The inferred value of $R_f$ was then used to estimate flow in the other four trials according to the measured change in pressure ΔP when the valve was opened. The difference was noted between these estimated flow rates (based on the inferred value of resistance, $R_f$), and their corresponding actual flow rates (obtained through the calibrated container trials). The results of this experiment are shown in a table 170, in FIG. 8.

Three of four residential structures tested (HI, H4, H5) had error rates below 8% (or approximately 0.16 GPM), which is comparable to the 10% error rates found in empirical studies of traditional utility-supplied water meters. The fourth residential structure (H7), however, had an error rate above 20%, which is believed to be due to the installation location of the sensor. Whereas the first three structures had the pressure sensor installed on an exterior water bib, in H7, the pressure sensor was installed on the hot water tank drain valve. Connecting the pressure sensor to the hot water tank drain valve results in the pressure sensor responding to both the supply water main pressure and the head pressure of the water in the tank. As discussed above, the simple pressure model employed in the present novel approach currently assumes a straight pipe and does not consider head pressure. It is likely that this situation requires a different model of $R_f$. It appears that cold water valves in H7 were particularly affected by this error source. Indeed, removing H7's four cold water valves from the analysis dramatically improves the average error to 0.15 GPM (SD=0.18), or 4.5% (SD=3.8%).

Estimating $R_f$ for Uncalibrated Valves

In the second scenario, where only a subset of the valves in a structure have been directly calibrated to determine resistance $R_f$, it seems reasonable to attempt to build a model of fluid resistance for the entire structure from that calibration for the subset of valves. The key idea is that although the pathway to each valve in the structure is unique, those paths also share a substantial amount of spatial overlap in the length and overall layout of the piping. For example, the toilet and sink in a particular bathroom typically share the same branch in the water system and the path lengths are about the same.

Figure 9:
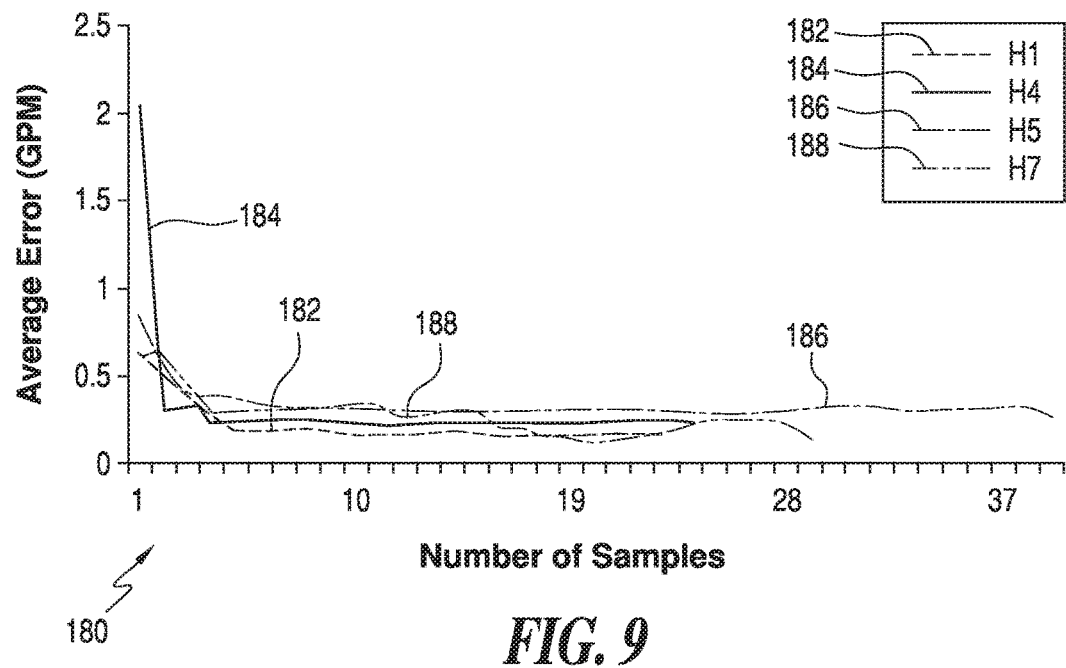
FIG. 9 is an exemplary graph showing average error in flow rate vs. the number of samples, for open valves in four of the test residential structures of FIG. 4.

To examine this approach, the calibrated container trials data were separated into two datasets, including a model and a test dataset. The model was initially populated by a single randomly selected trial, which was then used to infer a baseline $R_f$ value. This $R_f$ value was used to calculate a flow estimate for each trial in the test dataset, comparing each to the corresponding actual flow. Next, a second random trial was added to the model (and removed it from the test dataset); then, the model was used to create a linear regression ($Q = R_f^* \Delta P + b$, where b is a constant). The linear regression equation was used to calculate flow estimates for the remaining trials in the test set, and the process was repeated until all trials had been sampled. To avoid a particularly fortunate or unfortunate random sampling, this process was repeated five times for each residential structure, and the results were averaged. A graph 180 in FIG. 9 presents results 182, 184, 186, and 188 for residential structures H1, H4, H5, and H7, respectively (note that the results for the cold water valves were excluded from the curve for residential structure H7, as discussed above).

After sampling five trials, the average error decreased 74% to 0.27 GPM across the four residential structures and were within 0.11 GPM of the more comprehensive $R_f$ data from the previous analysis. This initial result indicates that it should be possible to generalize calibrations across valves in a structure in accord with the second scenario, so that it is unnecessary to empirically determine flow resistance for each fixture or appliance in a structure.

Details of Valve/Fixture Event Detection

Figure 11:
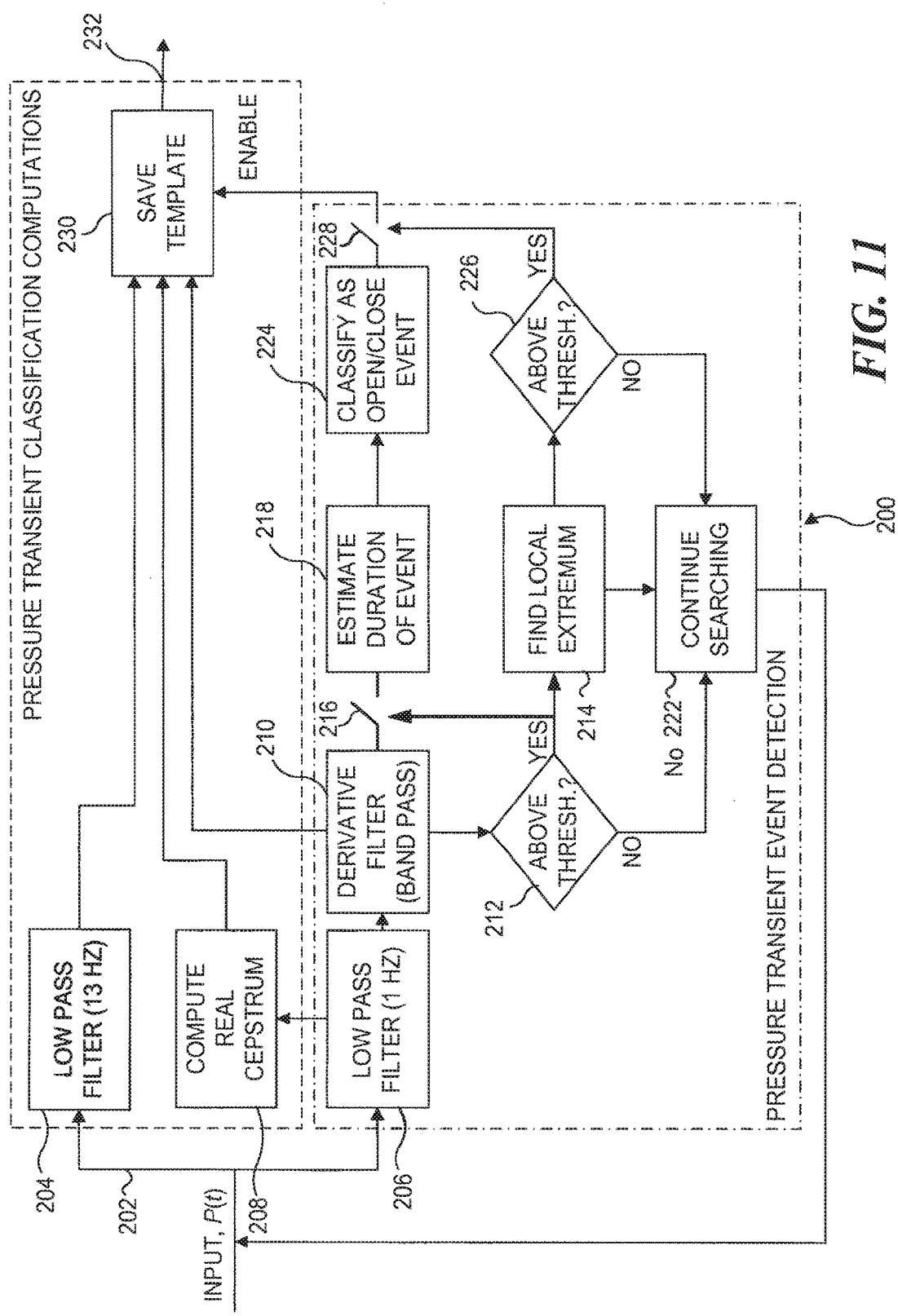
FIG. 11 is a logic flow diagram illustrating exemplary steps that can be used in the present approach for detecting fixture/valve events.

Exemplary logical steps 200 that are carried out for detection of valve/fixture event detection are illustrated in FIG. 11. The output signal P(t) from the pressure monitor is input as a signal 202 to both a low pass filter (13 Hz) 204 and a low pass filter (1 Hz) 206. Low pass filter 206 passes the filtered signal to a block 208, which computes the real Cepstrum of the signal, and to a derivative filter (bandpass) 210, which determines the derivative of the signal. The derivative is input to a decision block (a comparator) 212, which determines if the derivative is above a first predefined threshold. If so, a gate 216 that is coupled to receive the derivative from derivative filter 210 is closed, and the derivative is input to a block 218, which estimates a duration of the event by detecting a time interval between a beginning and an end of the event (determined as explained above). In addition, a positive response from decision block 212 causes a block 214 to find a local extremum for the derivative signal. The estimated duration of the event is input to a block 224, which classifies the event as being either an open event or a close event. A decision block (comparator) 226 determines if the local extremum found in block 214 is above a second predefined threshold, and if so, closes a gate 228, which enables a save template block 230 to save a template that includes features for the signal filtered by low pass filter 204, the real Cepstrum, and the derivative. Each template that is saved for a specific event thus includes low pressure features, Cepstral features, and derivative features, and the template is identified as being for either a specific valve open event or a specific valve close event (or some other activity on the system). The saved template is output on a line 232 for storage in a memory (not shown in this Figure).

If the derivative is not above the first predefined threshold in decision block 212, or if the local extremum is not above the second predefined threshold in decision block 226, the logic concludes that an event has not occurred. A block 222 provides for continuing the search to detect an event by processing the output signal P(t) from the pressure monitor, as discussed above.

Figure 12:
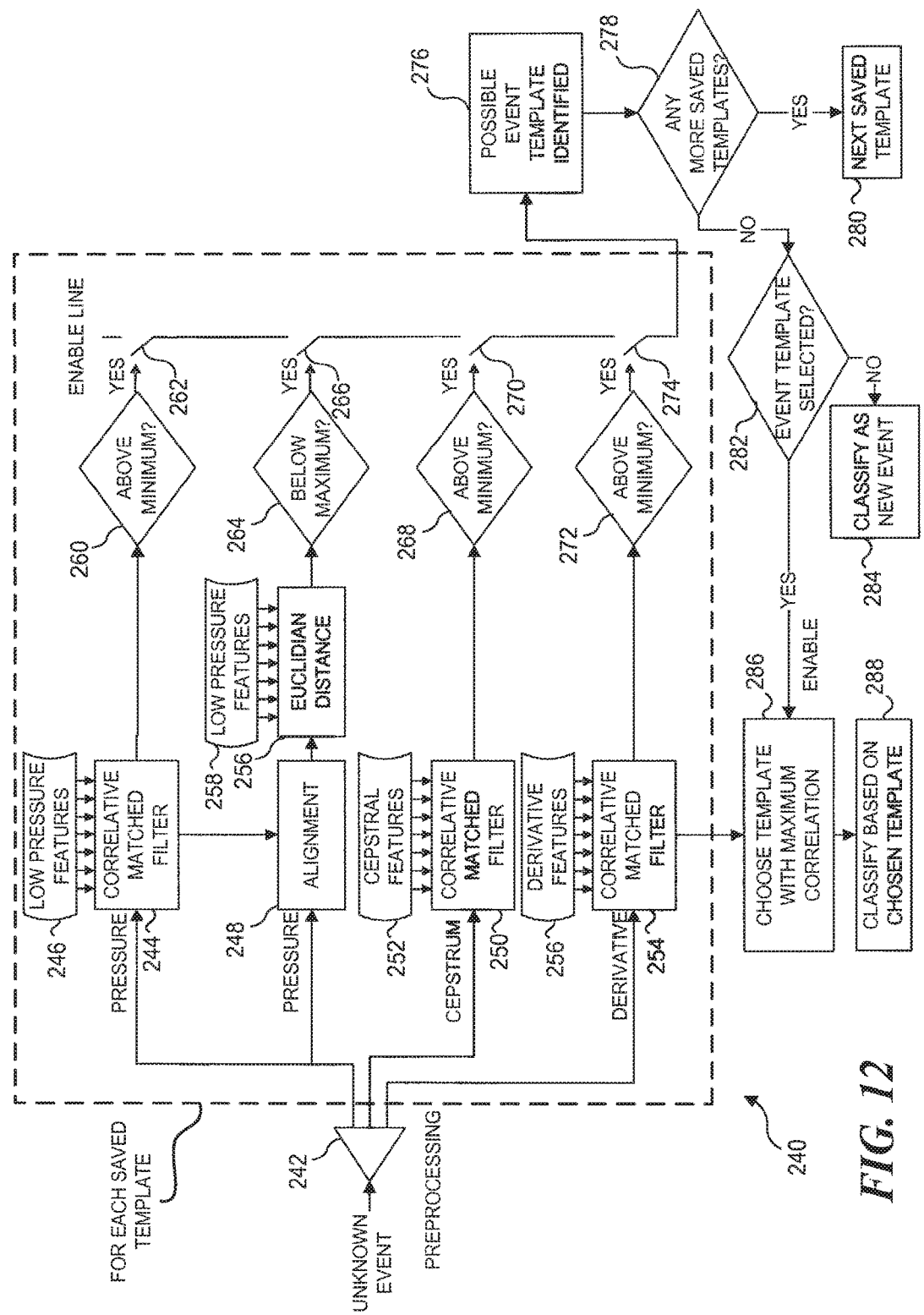
FIG. 12 is a logic flow diagram illustrating exemplary steps that can be used for classifying valve events in accord with the present novel approach.

In FIG. 12, a flowchart 240 illustrates exemplary steps for classifying an event by comparison to a plurality of saved templates that were created as discussed above in connection with FIG. 11. An unknown type of event that was detected is input to a preprocessor 242, which provides a pressure signal, a Cepstrum signal, and a derivative signal as outputs. The pressure signal is input to a correlative matched filter 244 for comparison with low pressure features 246 of a current template, and also supplied to an alignment block 248. The alignment block provides compensation for any variation in the main system pressure (i.e., for structures that do not include a pressure regulator), since changes in the main system pressure can shift the characteristics for a transient pressure wave sufficiently so that they no longer match the features of the template for that event. Additionally, the alignment block may time shift the unknown event to maximally overlap with the saved templates.

The derivative signal from preprocessor 242 is input to a correlative matched filter block 250 for comparison to Cepstral features 252 of the current template. Similarly, the derivative signal is input to a correlative matched filter 254 for comparison to the derivative features 256 of the current template. Correlative matched filter blocks 244, 250, and 254 produce correlation values that are respectively an indication of how closely the respective low pressure, Cepstral, and derivative features of the transient pressure wave signal for the unknown event match those of each saved template. A high correlation value for each of these parameters with the features of a template indicates that there is a high probability that the current unknown event is the event for which the template was saved.

The output of correlative matched filter 244 is input a to decision block (comparator) 260 to determine if it is above a predefined first minimum, and if so, a gate 262 is closed, coupling to an enable line. The output from alignment block 248 is applied to a Euclidian distance block 256, which determines a Euclidian distance (equal to the square root of the sum of the squares of the differences between low pressure features 258 of the current template and the corresponding compensated, aligned features of the pressure signal for the unknown event). The Euclidean distance result is input to a decision block (comparator) 264 to determine if it is below a predefined maximum. If so, a gate 266 is closed to couple to the downstream side of gate 262. The correlation value result from correlative matched filter 250 is input to a decision step (comparator) 268 to determine if it is above a predefined second minimum, and if so, a gate 270 is closed to couple to the downstream side of gate 266. Finally, the correlation value from correlative matched filter 254 is input to a decision block (comparator) 272 to determine if it is above a third predefined minimum, and if so, a gate 274 is closed, connecting to the downstream side of gate 270. If all of gates 262, 266, 270, and 274 are closed (corresponding to all inputs to an AND logic being true), the current template is a possible match for the unknown event being processed, and a block 276 will detect that condition to identify the current template as a possible match.

If any one or more of these four gates are open, (while not shown specifically), the logic will simply proceed to a decision block 278 and not identify the current template as a possible match to the unknown event. Decision block 278 determines if any more saved templates remain that have not yet been compared to the unknown event. If so, a block 280 repeats the comparison of the features for the unknown event, with the features of the next saved template, as described above. If no more saved templates remain, a decision block 282 determines if any event template was identified as possibly matching the unknown event. If not, the unknown event is classified as a new event in a block 284. Otherwise, an enable signal is supplied to a block 286 to enable choosing the saved template with the maximum correlation to the features of the unknown event. The outputs from correlative matched filter 254 feeds into a block 286, where (in response to the enable signal), the saved template with the highest correlation is chosen as the event type. Outputs from correlative matched filters 244 and 250 can also connect to block 286 (connections not shown) and be used in place of the outputs from correlative matched filter 254. Block 286 uses the outputs from any one of correlative matched filters 244, 250, or 254, based upon the ROC during training, as discussed above. The unknown event is then classified based on the chosen saved template (i.e., the saved template with the highest overall correlation according to outputs from correlative matched filters 244, 250, or 254) in a block 288.

Auto-Calibration

As a way to decrease labor and data entry costs, many water system utilities are replacing their old water meters with Automatic Meter Reading (AMR) systems. An AMR system enables the water system utility to automatically read their residential/commercial water meters wirelessly thereby greatly reducing costs by eliminating meter readers and manual transcription errors that occur when the meter is read and when the field recorded data are input to a billing system to generate the bill that will be provided to the customer. When used in connection with an AMR meter (or any meter capable of transmitting its liquid flow measurement data either wirelessly or over a wire lead), the present novel system can receive real-time information on aggregate flow volume and use these aggregate flow data to calibrate the flow estimation algorithms by determining the flow resistance to some or all of the valves in the water system of the structure.

To use an AMR (or similar) inline flow volume meter for semi-automatic calibration to determine flow resistance for different portions of the liquid distribution system, the following steps can be carried out.

(1) The present novel system queries the water meter (AMR or other wireless or wire connected inline flow volume meter) to obtain a baseline accumulated flow volume;

(2) A person with access to the structure (e.g., a homeowner for a residential structure) is instructed to individually open and then close each valve in the water system of the structure, leaving the valve in the open state for a short time (e.g., 15 seconds) before closing it;

(3) For each valve that is thus actuated by the person, the present novel system automatically determines that an open/close event has occurred, as well as the time duration that the valve was open;

(4) The present novel system then queries the water meter after the close event for each valve, and subtracts the previous flow volume amount (starting with the baseline value) from the new flow volume amount to obtain a total amount of flow through the valve while it was open. This total amount of flow through the valve is then divided by the valve open duration to obtain flow rate, which is used as discussed above, to determine the flow resistance of the water system in regard to the valve that was just opened and closed.

The semi-automatic calibration can be repeated as desired to compensate for changes in the water system, e.g., due to changes in temperature or due to the buildup or corrosion deposits or due to modifications in the layout of the piping or conduits.

Once the flow resistance of the system for each valve is thus accurately determined, the flow resistance can be used to determine the liquid flow at any valve of the system that is opened.

This entire calibration process can be made completely automatic, by causing the present novel system to rely on the AMR (or other wireless or wired connected) meter to provide flow volume data each time that an open/close event pair is detected. This approach might seem to eliminate the need for calibration of the water system to determine flow resistance, since it may appear that the present novel system would no longer be needed to estimate flow—if the flow rate can instead be obtained directly from the AMR meter for every open/close event pair of a valve. However, using the AMR meter for determining flow has limitations, because the AMR meter can only provide an aggregate value for total water flow. The AMR meter cannot indicate the flow for each of two or more overlapping events. In the case of compound events, the present novel system would still be used to estimate flow for each fixture for events that overlap.

Leak Detection

There are two approaches that the present novel system can employ to detect leaks in a water system, depending upon the type and cause of the leak, as follows.

If a high resolution AMR (or other wireless or wire connected) flow volume meter is installed in the liquid system of a structure, the present novel system can detect any low-flow water usage that occurs over an extended time interval during which no open valve event is detected at any fixture in the structure (for example, during a 6-12 period during which people are away from the structure, or while people are asleep at night, and the water system is not in use or no fixture valve was opened). Clearly, any aggregate flow volume detected in the water system by the high resolution flow volume meter during this time when no valve has been opened must be an indication of a slow leak. Such leaks might be due to the formation of a pinhole in a pipe as a result of freeze damage or due to corrosion, or may result from a continuous leak through a valve that is not completely closed or through a valve that has a leaky valve stem seal or leaky valve seat.

Another common type of leak is the result of a leaky flapper valve on a toilet, which allows water to flow into a toilet bowl. The excess flowing into the bowl then empties into the drain. This type of leak causes a periodic toilet open/close event to be detected when the toilet tank refills, but differs from a normal toilet flush opening and closing the toilet flapper valve, since only a portion of the water tank is refilled when the level in the toilet water tank drops due to flapper valve leakage. When water leaks from a toilet tank through a leaky flapper valve, the level of water in the tank eventually decreases to a point that automatically triggers the inlet valve for the tank to start a refill. The refill can occur after only 0.1-0.3 gallons have leaked into the bowl—in contrast to the 2 gallons or more that are emptied from the toilet tank into the bowl during a normal toilet flush. The refill that results from a leaking flapper valve causes an open event while the toilet inlet valve refills the tank and a close event when the toilet refill ceases as the water level in the tank reaches the shut off depth, so that the float valve closes. The flapper valve remains nominally closed during this refill but still continues leaking water into the bowl.

The open/close event pair for a leaky flapper valve is shorter in duration than a normal toilet fill event after a normal toilet flush (since less water is needed to refill the tank), but this shorter term refill and shorter term valve open event is still detectable by the present novel system. In addition to the shorter term of the leak refill event, the periodic nature of a flapper valve toilet tank leak makes it easier to differentiate from a normal event (e.g., the toilet might refill at 34 minute intervals-if not interrupted by a normal toilet flush). Other types of leaks that exhibit this periodic behavior, such as leaks from other types of liquid reservoirs having a hysteresis between levels used to trigger a valve open and a valve close event can also be detected using this approach. The characteristics of the water flow through the valve enable the flapper valve in a specific toilet that is leaking in this manner to be distinguished when two or more toilets are included in a structure.

Multiple Sensing Points

Multiple sensors can be installed on a liquid distribution system of a structure to detect pressure transient signatures caused by a single event at two or more different locations where the pressure sensors are disposed. A time-difference between the onset of the two transient signatures can be used in identifying the event by choosing from a set of known time difference templates that have previously been saved, for example, generally as disclosed in connection with the saving of event templates that include features for low pressure, derivative, and real Cepstrum characteristics of a pressure transient waveform, as discussed herein. The time difference can be used to pinpoint the location of a fixture where an event occurred, because of a difference in the distances between the originating source and each different sensing point.

Figure 13A:
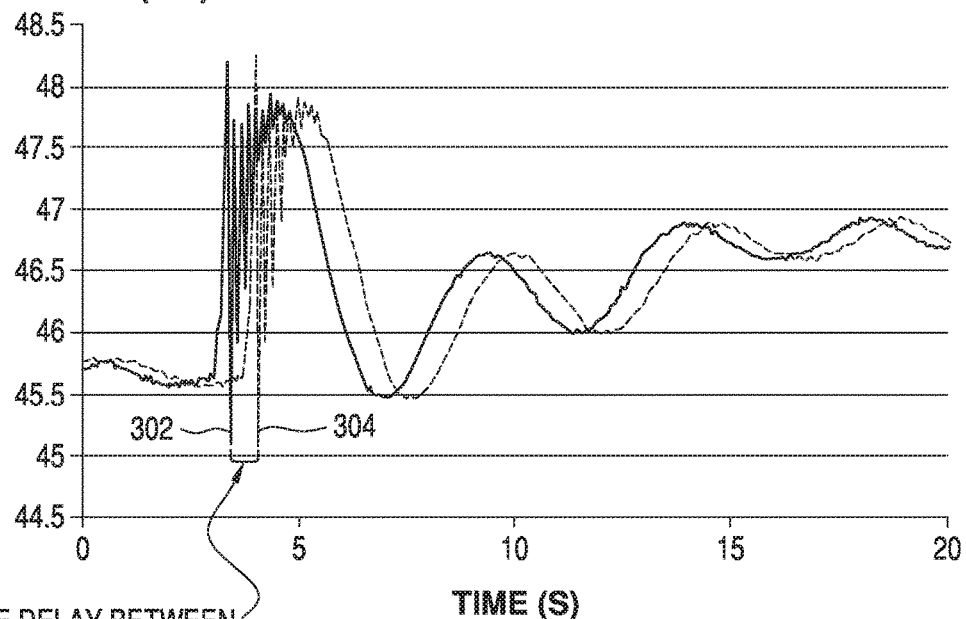
FIG. 13A illustrates the raw output signals from two pressure sensors disposed at different points on a water system of a structure, illustrating the time delay between the output signals for a common fixture event.

FIG. 13A is a graph 300 illustrating raw pressure output signals 302 and 304, which correspond to the same fixture event being detected by two spatially dispersed pressure sensors on a water system. The two output signal waveforms from the two different pressure sensors appear similar in shape (although there are some differences in amplitude and high frequency attenuation due to the different paths followed by the pressure transient waves received by the two pressure sensors and differences in the response of the pressure sensors), but the waveforms are offset from each other in time by about 800 ms. This time delay offset feature is independent of the structure water system pressure and the amplitude of the waveforms, thus providing a robust approach for discriminating the source of an event at the fixture level.

Figure 13B:
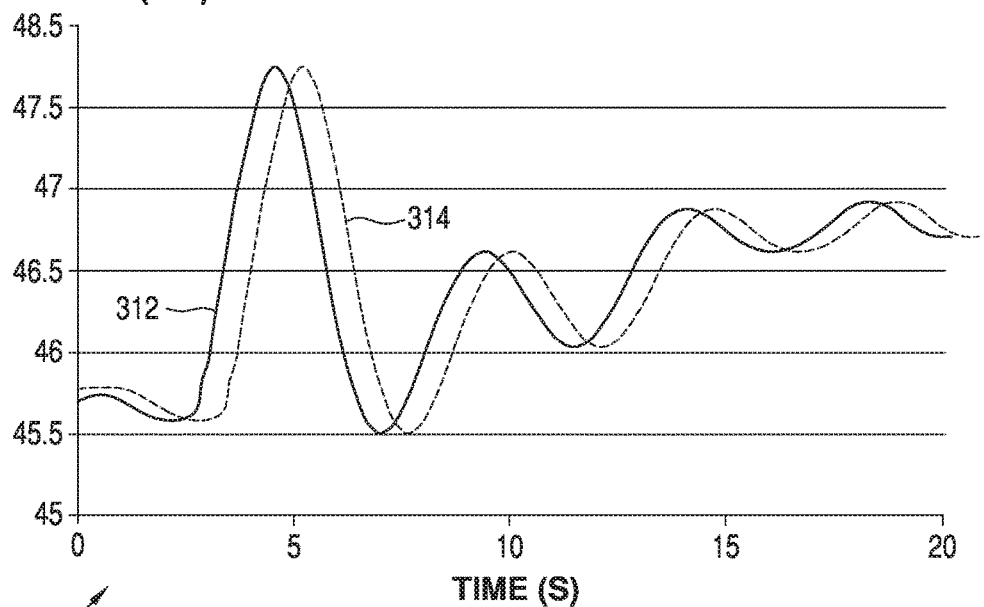
FIG. 13B illustrates the waveforms resulting from passing each of the two raw output signals of FIG. 13A through a 13 Hz low pass filter, clearly showing the time shift between the two waveforms due to the different signal propagation paths to each pressure sensor from the fixture.

FIG. 13B is a graph 310 showing filtered pressure output signals 312 and 314, after they have been filtered through a 13 Hz low pass filter. This low pass filter suppresses the higher frequency components of the waveforms, making the time delay between them more apparent.

Active Water Event Probing

The pressure sensor or transducer used to detect pressure transients in the water system can be reversed biased to produce a known pressure transient pulse that propagates through the water system. An exemplary active pressure signal wave 322 is shown in a graph 320 in FIG. 14A. This active pressure signal wave is used to interrogate a position of the valves in the system by observing reflected signals that are returned to the pressure sensor. FIG. 14B is a graph 324 illustrating an exemplary reflected pressure signal 326, such as the pressure signal that is reflected from a closed valve in a water system.

Various characteristics of the reflected pressure signal can be used to create a new template that includes characteristic features of the reflected active probe pressure waves. Such templates associated with the valves in a system can be saved and used for processing subsequent reflected pressure waves from the probe pressure pulse signals supplied as an output signal from the pressure sensor. Changes in these reflected signal features indicate a change in the state of the water system (e.g., a closed valve being opened). An open valve will cause the signal to undergo a high frequency attenuation, as well as a phase shift (see exemplary reflected signal 326 in FIG. 14B). These two features can be used to estimate the path of the reflected signal and as an indication of water flow. Active pressure pulse probing may be useful to query the current states of valves in a liquid distribution system of a structure, for example, if events are missed using the novel passive approach discussed above.

Exemplary Computing Device for Processing Output Signal from Pressure Module

FIG. 15 schematically illustrates an exemplary computing device 350 that comprises a computer 364 suitable for implementing the present novel technique. Computer 364 may be a generally conventional personal computer (PC) such as a laptop, desktop computer, server, or other form of computing device. Computer 364 is coupled to a display 368, which is used for displaying text and graphics to the user, such as data related to events, activity, and specific fixtures where water has been or is being consumed, as well as the flow rate to specific fixtures. Included within computer 364 is a processor 362. A memory 366 (with both read only memory (ROM) and random access memory (RAM)), a non-volatile storage 360 (such as a hard drive or other non-volatile data storage device) for storage of data and machine readable and executable instructions comprising modules and software programs, and digital signals, a network interface 352, and an optical drive 358 are coupled to processor 362 through a bus 354. Data that are stored can include templates, predefined thresholds, and other parameters used in processing the output signal from the pressure module. Any of these data can alternatively be accessed over a network 370, such as the Internet or other network, through network interface 352. Optical drive 358 can read a compact disk (CD) 356 (or other optical storage media, such as a digital video disk (DVD)) on which machine instructions are stored for implementing the present novel technique, as well as other software modules and programs that may be run by computer 364. The machine instructions are loaded into memory 366 before being executed by processor 362 to carry out the steps for implementing the present technique, e.g., carrying out divide, multiply, and subtraction steps, as discussed above. The user can provide input to and/or control the process through keyboard/mouse 372, which is coupled to computer 364. A Bluetooth radio 374 is also connected to bus 354 for receiving a Bluetooth radio signal 376 from the pressure module. It will be appreciated that other types of wired or wireless communication links can convey the output signal from the pressure module. For example, a Wi-Fi radio signal or an Ethernet or uniform serial bus (USB) wired communication link can be used instead of the Bluetooth radio. The output signal can also be stored as data on a non-volatile memory medium and subsequently processed with computer 364 to review the water usage and/or flow rate in a structure.

DISCUSSION

The novel approach disclosed herein shows significant promise for single-point sensing of activity in a liquid distribution system via continuous monitoring of the pressure in the system. The approach clearly represents a reliable method for segmenting valve pressure events from their surrounding pressure sensor output signal stream and for determining whether a segmented event corresponds to a valve being opened or closed. Empirical testing has shown the efficacy and accuracy of the present approach. Using data collected in nine residential structures, a 95.6% aggregate accuracy in identifying an individual fixture associated with a valve event was demonstrated. Analyzing flow data collected in four of those residential structures, it has been shown that an appropriately located and calibrated system can estimate water usage with error rates comparable to empirical studies of traditional utility-supplied water meters. The ability to identify activity at individual fixtures using a single sensor is itself an important advance. Adding an additional sensor at a point in the liquid distribution system separated from a point where the first sensor is installed provides additional information about events in the system, based on the delay time between the transient pressure waveform signals output from the sensors. It should again be emphasized that although an initial evaluation of the present novel approach was applied to monitor water usage, events, and activities at various fixtures in residential structures, there is no reason to limit this approach to either that type of structure or to monitoring events and activity involving only water in a water system. Instead, this approach is applicable to almost any application in which it is desired to monitor events and activity involving a liquid flowing through liquid distribution passages such as pipes or conduits. For example, the present approach can be used to monitor valve events and other activity, to determine flow rates of various liquids, or detect leaks in a chemical processing facility or in a brewery. As noted above, the term "structure" as used herein and in the claims that follow is intended to be broadly interpreted, so as to encompass any facility in which a liquid distribution system conveys a liquid to various fixtures or through valves or other flow altering devices. A water system in a residential structure is thus just one example of such a liquid distribution system, and water is just one example of such a liquid.

Figure 10:
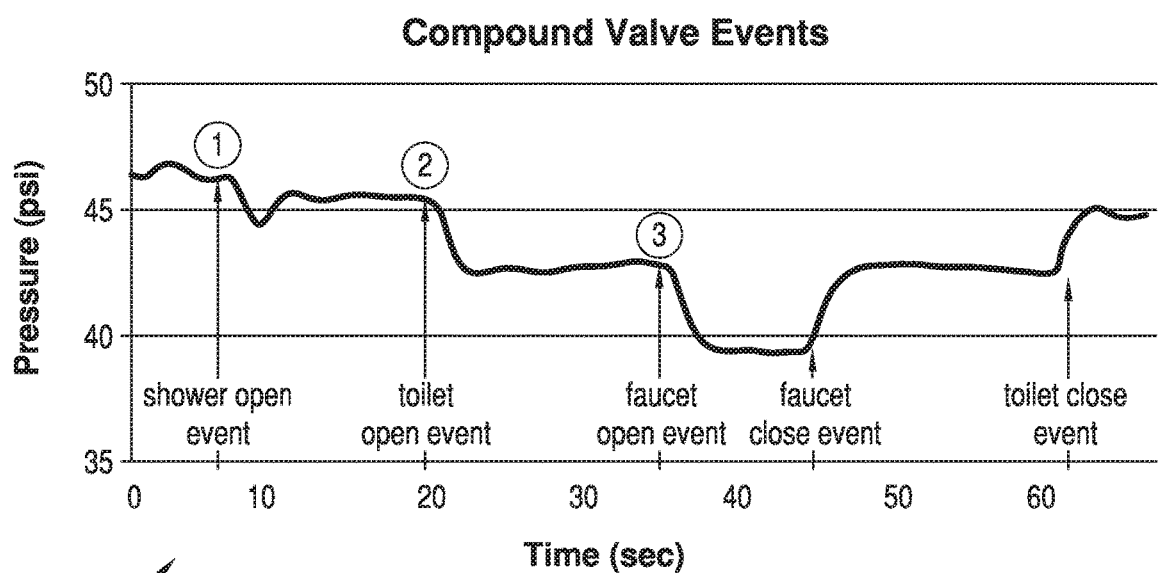
FIG. 10 is an exemplary graph of pressure vs. time for a plurality of overlapping events occurring in a water system, wherein valves for a shower, a toilet, and a faucet are open over overlapping periods of time, illustrating that the present novel approach is able to detect each event and each fixture at which the event occurred.

Although the analysis discussed above focused on identifying fixture events occurring in isolation, it is clearly important to consider the case where multiple events overlap. To evaluate the capability of the present novel approach in this regard, six compound events were collected in residential structure H1 (two each of shower/sink, toilet/sink, and shower/toilet/sink overlaps), as partially shown in a graph 190 in FIG. 10, which shows a shower open event 1 overlapping with a toilet open event 2, overlapping with a faucet open event 3, followed by the close event for the faucet, and the close event for the toilet. The event segmentation algorithm was able to correctly segment these overlapping events (i.e., was able to identify the end of an ongoing event when a rapid increase in the magnitude of pressure fluctuation corresponding to the beginning of an overlapping event was detected). A visual inspection of the pressure transient waveforms suggests that the magnitude and shape of the events is relatively undisturbed by the overlap. Further, it should also be possible to classify such compound events using the approach described herein.

It was determined that a reliable estimation of flow rate is sensitive to accurate calibration, and an empirical approach can be used to perform this calibration, as discussed above. It is contemplated that further empirical tests should be able to identify optimal threshold parameters for the segmentation and identification algorithms discussed above.

There is initial evidence that water system behavior is generally stable over time, based on a second dataset that was collected in H1 five weeks after the original collection. The fixture classification methods explained above were applied to this pair of datasets using templates from the opposite dataset (classifying unknown events using templates collected five weeks apart)—without finding any degradation in fixture identification performance, which suggests that system behavior might be sufficiently stable to apply a variety of machine learning methods to enable auto-calibration of the water system flow rate.

The data collection for the tests at the residential structures included installation of the pressure sensor at several different types of fixtures (hose bibs, utility sink faucets, water heater drain valves) with generally good results. Two identical collections of data were carried out in H9, one using the pressure sensor coupled to a hose bib and one using the pressure sensor coupled to a hot water heater drain valve, under the expectation that performance would be nearly identical for each. FIG. 6 reports the performance for the pressure sensor coupled to the hose bib. In contrast, the performance fell to 88.6% for open valve events and 65.7% for close valve events when the pressure sensor was moved to the water heater drain valve (only individual fixture classification was affected, not segmentation or the determination of whether events are open or close events). This change in the performance level indicates that the location of the pressure sensor can affect the accuracy of the results for the present novel approach, but in general, it appears that the coupling of the pressure sensor to almost any other faucet bib in a structure other than the drain valve of the water heater will provide acceptable performance. There were other examples indicated in FIG. 6 where the current novel approach differed in its ability to identify the specific fixture associated with valve open and close events. Although valve open and close events come in pairs, the present approach classifies them individually. It is thus contemplated that by jointly classifying pairs of valve open and valve close events, improved accuracy can be achieved in identifying the fixture where the valves are located. Similarly, although as discussed above, flow rate is estimated independently of fixture identification, the two are clearly related and it is expected that improved results might be achieved in estimating flow rate in connection with the fixture consuming water.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

What is claimed is:

1. A method comprising:
monitoring water pressure at one or more locations of a water distribution system of a building using one or more pressure sensors to produce one or more pressure signals, the building comprising two or more water appliances coupled to the water distribution system; and
using the one or more pressure signals to determine that a first water appliance of the two or more water appliances is consuming water and to determine a first individual water usage amount for the first water appliance,
wherein:
the first water appliance of the two or more water appliances comprises a reservoir with a reservoir valve that opens automatically if a level of water in the reservoir drops below a predefined level; and
the method further comprises:
detecting a leak from the reservoir by identifying one or more characteristics in the one or more pressure signals.

2. The method of claim 1, further comprising:
using the one or more pressure signals to determine that a second water appliance of the two or more water appliances is consuming water and to determine a second individual water usage amount for the second water appliance.

3. The method of claim 2, further comprising:
determining the first individual water usage amount and the second individual water usage amount when the first and second water appliances are consuming water simultaneously; and
determining the first individual water usage amount and the second individual water usage amount when the first and second water appliances are consuming water separately.

4. The method of claim 1, further comprising:
using the one or more pressure signals to determine a total water usage amount for the water distribution system.

5. The method of claim 1, further comprising:
using the one or more pressure signals to detect a second leak in the water distribution system.

6. The method of claim 1, further comprising:
receiving flow volume information from a flow volume meter that measures an aggregate value of total water flow for the water distribution system; and
using the flow volume information to calibrate using the one or more pressure signals to determine individual water usage amounts of the two or more water appliances.

7. The method of claim 1, wherein:
the one or more locations of the water distribution system are not located in the water distribution system between a water source and the first water appliance.

8. The method of claim 1, wherein:
the one or more locations of the water distribution system are located at one or more end points of the water distribution system.

9. The method of claim 1, wherein:
the two or more water appliances comprise at least two of: a faucet, a bathroom sink, a toilet, a kitchen sink, a bathtub, a dishwasher, a shower, a hot water heater, or a clothing washing machine.

10. The method of claim 1, wherein:
the first water appliance of the two or more water appliances comprises a toilet that comprises the reservoir and the reservoir valve.

11. A system comprising:
one or more pressure sensors configured to monitor water pressure at one or more locations of a water distribution system of a building to produce one or more pressure signals, the building comprising two or more water appliances coupled to the water distribution system; and
a processing system configured to use the one or more pressure signals to determine that a first water appliance of the two or more water appliances is consuming water and to determine a first individual water usage amount for the first water appliance,
wherein:
the first water appliance of the two or more water appliances comprises a reservoir with a reservoir valve that opens automatically if a level of water in the reservoir drops below a predefined level; and
the processing system is further configured to detect a leak from the reservoir by identifying one or more characteristics in the one or more pressure signals.

12. The system of claim 11, wherein:
the processing system is further configured to use the one or more pressure signals to determine that a second water appliance of the two or more water appliances is consuming water and to determine a second individual water usage amount for the second water appliance.

13. The system of claim 12, wherein:
the processing system is further configured to:
determine the first individual water usage amount and the second individual water usage amount when the first and second water appliances are consuming water simultaneously; and
determine the first individual water usage amount and the second individual water usage amount when the first and second water appliances are consuming water separately.

14. The system of claim 11, wherein:
the processing system is further configured to use the one or more pressure signals to determine a total water usage amount for the water distribution system.

15. The system of claim 11, wherein:
the processing system is further configured to use the one or more pressure signals to detect a second leak in the water distribution system.

16. The system of claim 11, wherein:
the processing system is further configured to:
receive flow volume information from a flow volume meter that measures an aggregate value of total water flow for the water distribution system; and
use the flow volume information to calibrate the processing system for using the one or more pressure signals to determine individual water usage amounts of the two or more water appliances.

17. The system of claim 11, wherein:
the one or more locations of the water distribution system are not located in the water distribution system between a water source and the first water appliance.

18. The system of claim 11, wherein:
the one or more locations of the water distribution system are located at one or more end points of the water distribution system.

19. The system of claim 11, wherein:
the two or more water appliances comprise at least two of: a faucet, a bathroom sink, a toilet, a kitchen sink, a bathtub, a dishwasher, a shower, a hot water heater, or a clothing washing machine.

20. The system of claim 11, wherein:
the first water appliance of the two or more water appliances comprises a toilet that comprises the reservoir and the reservoir valve.

* * * * *